(12) United States Patent
Utsugi et al.

(10) Patent No.: US 7,436,524 B2
(45) Date of Patent: Oct. 14, 2008

(54) APPARATUS AND METHOD FOR THREE-DIMENSIONAL MEASUREMENT AND PROGRAM FOR ALLOWING COMPUTER TO EXECUTE METHOD FOR THREE-DIMENSIONAL MEASUREMENT

(75) Inventors: Hironori Utsugi, Hachioji (JP); Go Ryu, Kawasaki (JP); Hideki Obuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 379 days.

(21) Appl. No.: 11/286,068

(22) Filed: Nov. 23, 2005

(65) Prior Publication Data

US 2006/0116851 A1 Jun. 1, 2006

(30) Foreign Application Priority Data

| Nov. 26, 2004 | (JP) | ............................ 2004-342497 |
| Nov. 29, 2004 | (JP) | ............................ 2004-344192 |
| Sep. 20, 2005 | (JP) | ............................ 2005-271761 |

(51) Int. Cl.
*G01B 11/24* (2006.01)

(52) U.S. Cl. ..................................... 356/603; 356/601
(58) Field of Classification Search .......... 356/600–613
See application file for complete search history.

(56) References Cited

U.S. PATENT DOCUMENTS

| 4,294,544 A | * | 10/1981 | Altschuler et al. | .......... 356/610 |
| 4,349,277 A | * | 9/1982 | Mundy et al. | .............. 356/604 |
| 4,413,910 A | * | 11/1983 | Cornu et al. | ............... 356/615 |
| 4,452,534 A | * | 6/1984 | Gribanov et al. | ............ 356/513 |
| 4,588,270 A | * | 5/1986 | Tamaki | ........................ 351/212 |
| 4,964,726 A | * | 10/1990 | Kleinknecht et al. | ......... 356/496 |

(Continued)

FOREIGN PATENT DOCUMENTS

JP 3-274404 12/1991

(Continued)

OTHER PUBLICATIONS

Tonooka, M., et al., "Surface Profile Measurement by Phase Detection using Grating Projection Method", Journal of the Japan Society for Precision Engineering vol. 66, No. 1, 2000.

*Primary Examiner*—L. G. Lauchman
*Assistant Examiner*—Jarreas C Underwood
(74) *Attorney, Agent, or Firm*—Scully, Scott, Murphy & Presser PC

(57) ABSTRACT

The present invention has a three-dimensional apparatus including a lattice pattern placed in an optical path and having a slit-like light transmitting portion formed of pitches set at fixed intervals, and a projecting optical system that projects a lattice pattern image formed by the lattice pattern on the sample so that the image is inclined at a predetermined angle. A lattice pitch is determined on the basis of set parameters including the magnification of an observing system. A pattern is formed by the lattice pitch. The pattern is used to pick up a deformed lattice pattern image using a TV camera. An image of each position is acquired while shifting the lattice pattern over several levels. A phase is determined. A height is then determined using the difference between the phase and a basic phase corresponding to a pre-provided magnification or the like. The height is then displayed.

16 Claims, 22 Drawing Sheets

U.S. PATENT DOCUMENTS

| | | | | |
|---|---|---|---|---|
| 4,978,220 A | * | 12/1990 | Abramovich et al. | 356/394 |
| 5,184,021 A | * | 2/1993 | Smith | 250/559.19 |
| 5,266,791 A | * | 11/1993 | Morizumi | 250/201.3 |
| 5,381,225 A | * | 1/1995 | Kohno | 356/237.5 |
| 5,576,829 A | * | 11/1996 | Shiraishi et al. | 356/521 |
| 5,615,003 A | * | 3/1997 | Hermary et al. | 356/3.03 |
| 6,361,167 B1 | * | 3/2002 | Su et al. | 351/206 |
| 6,483,641 B1 | * | 11/2002 | MacAulay | 359/385 |
| 6,495,848 B1 | * | 12/2002 | Rubbert | 250/559.22 |
| 2002/0018192 A1 | * | 2/2002 | Nishi | 355/53 |
| 2003/0185430 A1 | * | 10/2003 | Theobald et al. | 382/141 |

FOREIGN PATENT DOCUMENTS

| | | |
|---|---|---|
| JP | 10-47936 | 2/1998 |
| JP | 2000-9444 | 1/2000 |
| JP | 2004-191240 | 7/2004 |

* cited by examiner

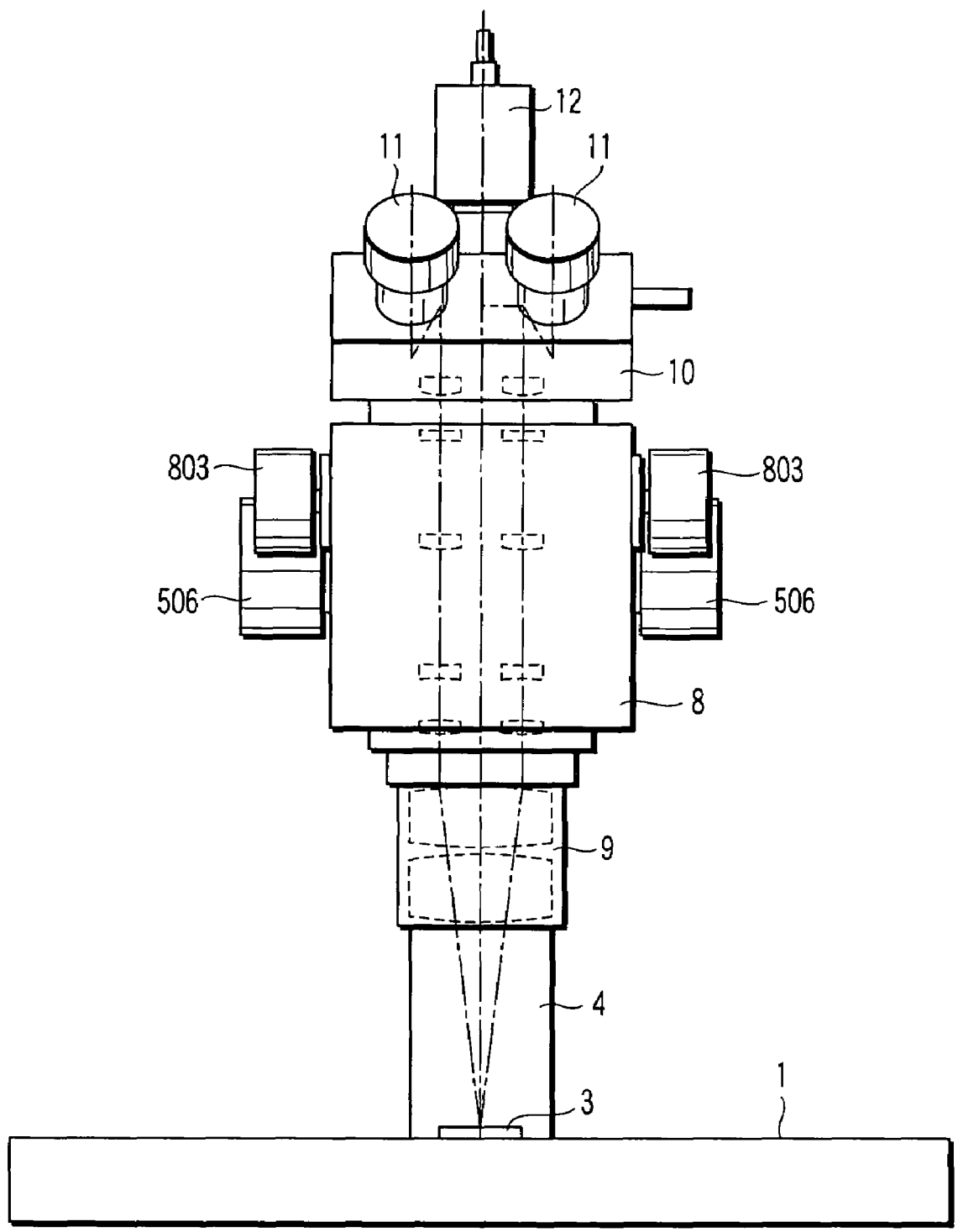
F I G. 2

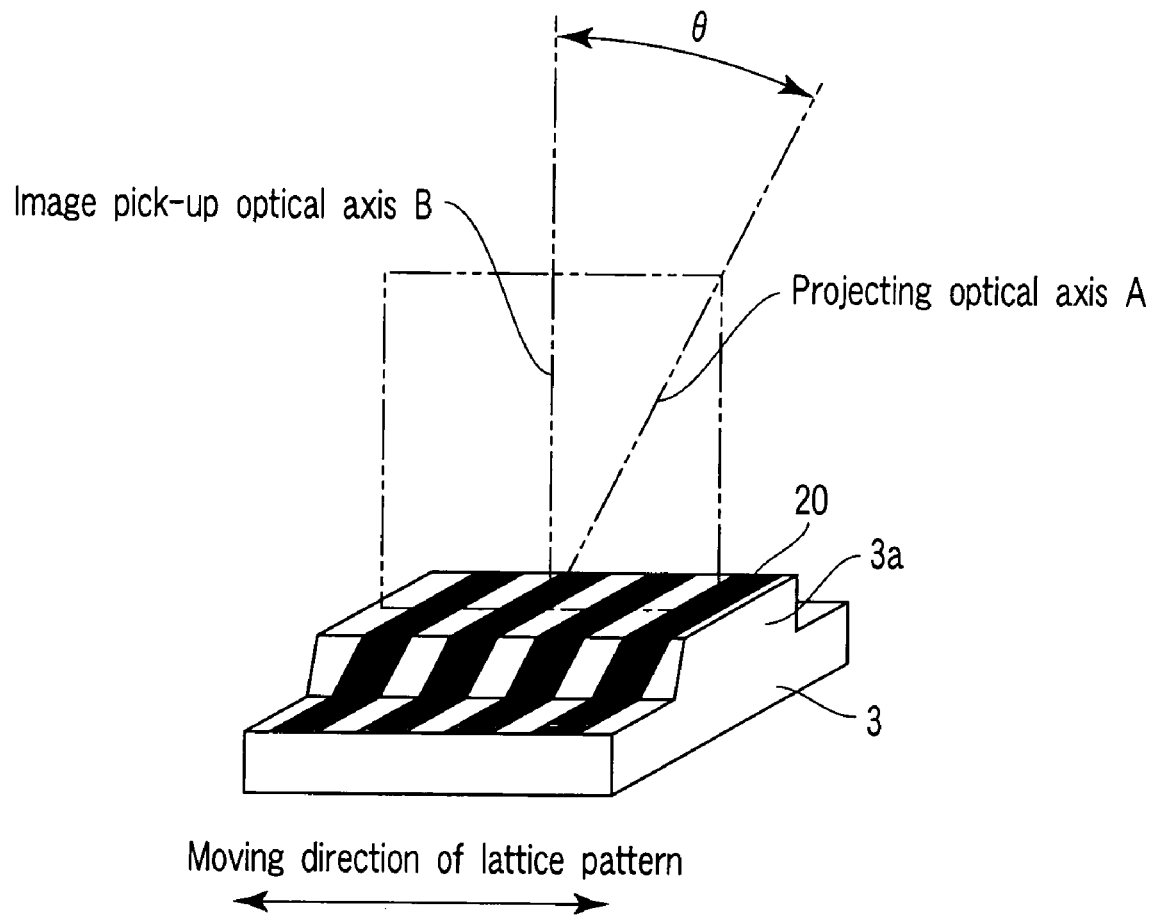
F I G. 14

APPARATUS AND METHOD FOR THREE-DIMENSIONAL MEASUREMENT AND PROGRAM FOR ALLOWING COMPUTER TO EXECUTE METHOD FOR THREE-DIMENSIONAL MEASUREMENT

CROSS-REFERENCE TO RELATED APPLICATIONS

This application is based upon and claims the benefit of priority from prior Japanese Patent Applications No. 2004-342497, filed Nov. 26, 2004; No. 2004-344192, filed Nov. 29, 2004; and No. 2005-271761, filed Sep. 20, 2005, the entire contents of all of which are incorporated herein by reference.

BACKGROUND OF THE INVENTION

1. Field of the Invention

The present invention relates to a three-dimensional measuring apparatus that uses a lattice pattern projection method for measuring the three-dimensional shape of a sample surface to obtain for example, information on the height of the sample, a method for three-dimensional measurement employing the lattice pattern projection method, and a program for allowing a computer to execute the method for three-dimensional measurement.

2. Description of the Related Art

A lattice pattern projection method is conventionally known as a means for measuring the surface shape of an object to be measured which constitutes a three-dimensional shape. The lattice pattern projection method involves projecting a lattice pattern on the surface of the object and utilizing the principle of triangulation to calculate height information on the basis of how the lattice pattern is deformed. The lattice pattern projection method is also called a phase shift method. With the lattice pattern projection method, a lattice pattern with a brightness varying like a sine waveform is projected on the surface of the object to be measured so that an image of the lattice pattern is inclined at a predetermined angle. An image pickup system picks up a plurality of images of light scattered by the surface of the object to be measured, while shifting the phase of the lattice pattern projected on the object to be measured. Deformed pattern images are thus obtained. A three-dimensional measuring apparatus arithmetically processes the picked-up images to extract phase information, thus determining the three-dimensional surface shape of the object to be measured.

FIG. 26 shows an example of a method using the conventional triangulation. In this example, a projection system (not shown) and an image pickup system (not shown) constitute a telecentric optical system; incident beams 301 are incident on the projection system and reflected beams 302 are guided to the image pickup system. Further, a reference plane 304 is provided for an object to be measured 303. All the calculated heights are considered to be based on the reference plane 304. The height of the object to be measured 303, for example, the height High of a point A, is determined using the position of a lattice projected at the point A and the position of a lattice projected at a point B on the reference plane 304. That is, the height High is determined using the phase $\phi a$ of the point A and the phase $\phi b$ of the point B ($\phi b$ is called a reference phase) as well as Equation (1), shown below.

$$\text{High} = (\text{Pitch} \times (\phi a - \phi b)) / (\sin \alpha \times 2\pi) \quad (1)$$

In this equation, Pitch is the pitch of a lattice pattern, and $\alpha$ is an incident angle.

The phase of each point using phase shift is convoluted into the range of 0 to $2\pi$. Accordingly, the determined height is also convoluted into the range of Pitch/sin $\alpha$. Moreover, measurements of larger heights can be reproduced by using a technique such as phase connection. For the phase connection, a method disclosed in for example, Jpn. Pat. Appln. KOKAI Publication No. 2000-009444 is used.

Further, such a three-dimensional measuring apparatus is disclosed in, for example, Journal of the Japan Society for Precision Engineering Vol. 66 No. 1. 2000.

As previously described, the lattice pattern projection method utilizes the principle of triangulation as a method for determining the height of an object to be measured, on the basis of phase information. In the lattice pattern projection method, the projecting optical axis and image pick-up optical axis of a lattice pattern do not coincide with each other. Accordingly, a predetermined angle is present between the projecting optical axis and the image pick-up optical axis. In this case, measurement accuracy is improved by increasing the angle between the projecting optical axis and the image pick-up optical axis. However, in contrast, the size of the shadow (dead angle) of the object to be measured increases to widen a non-measurable range. Further, within the range in which the lattice pattern is not projected, the height cannot be correctly calculated because information on the lattice pattern is not obtained.

Jpn. Pat. Appln. KOKAI Publication No. 2004-19124 discloses an apparatus that reduces the size of a shadow occurring in the object to be measured. A plurality of projecting optical units are arranged in this apparatus. The projecting optical unit can project a pattern from different directions with respect to the optical axis of the image pick-up optical system. This allows the apparatus to suppress the occurrence of a shadow in the object to be measured. The document also describes that the plurality of projecting optical units operate independently to vary projection angle.

However, the apparatus disclosed in Journal of the Japan Society for Precision Engineering Vol. 66 No. 1. 2000 is intended for image pickup carried out by a TV camera and does not deal with visual checks. Further, a lattice pattern projecting device has an intermediate lens barrel type configuration in which it is installed in a lens barrel attachment portion of a stereomicroscope. Thus, when the lattice pattern projecting device contains an optical member switching mechanism so as to deal with visual checks and another intermediate lens barrel is to be combined with the device, the size of the intermediate lens barrel increases. As a result, an optical path is extended, and the lattice pattern projecting device poses optical problems such as an insufficient quantity of peripheral light and an eclipse. Another problem is a limitation to the system. Moreover, the increased size of the intermediate lens barrel raises eye points. This is not preferable from an ergonomic viewpoint. Furthermore, the angle at which a lattice pattern is projected on a sample is limited by the inward angle of the stereomicroscope. This precludes the obtainment of measurement accuracy corresponding to the sample. In general, measurement accuracy increases consistently with the projection angle $\alpha$. However, owing to the relatively small inward angle of the stereomicroscope, the measurement accuracy is not expected to be significantly improved.

An apparatus in accordance with a first embodiment disclosed in Jpn. Pat. Appln. KOKAI Publication No. 2004-191240 comprises two independent projecting optical units arranged in V form, two illuminating optical systems, and two optical modulation elements each having a lattice pattern. The apparatus thus has a large number of components and is expensive. If the illuminating optical systems and optical modulation elements were integrally arranged while maintaining the V-shaped configuration of the projecting optical units, the apparatus would be slightly less expensive. However, the apparatus requires a large space owing to its configuration. It is thus difficult to make the apparatus compact. Further, if an objective lens in the image pick-up optical system is used to carry out projection in two directions as in the case of a second embodiment, the apparatus can be made relatively compact by combining the illuminating optical systems with the optical modulation elements. In this case, two projecting optical paths are extended off the optical axis of one objective lens to create an angle between the two projection directions. However, this angle is limited by the effective diameter of the objective lens. Thus, to increase the angle between the two projection directions, it is necessary to increase the effective diameter of the objective lens. Furthermore, to move the two projecting optical axes within the range of the effective diameter of the objective lens, it is necessary to move each of the two projecting optical unit, illuminating optical units, and optical modulation units. However, the movement is likely to result in accuracy errors. Moreover, the mechanism is complicated, making it difficult to provide an inexpensive apparatus. In addition, since the amount of variation in projection direction is equal to or smaller than the effective radius of the objective lens, the apparatus is not suitable for markedly varying the projection direction.

In recent three-dimensional measuring systems, the pitch of the lattice pattern and the magnification of an observation system are fixed. Accordingly, the magnification of the observation system must be frequently varied every time the object to be measured is changed.

The relationship between the pitch of the lattice pattern and the magnification of the observation system is such that resolution increases with decreasing lattice pattern pitch and increasing magnification. This serves to improve measurement accuracy for the object to be measured. In contrast, when the pitch of the lattice pattern to be measured is small with respect to a high object to be measured, a long time is required for a phase connection process. This increases the total time required for measurements.

Thus, to change the object to be measured, it is necessary to set the lattice pattern pitch taking the balance between measurement accuracy and measurement speed (measurement time) into account in accordance with the state of the object to be measured. Further, a high magnification of the observation system may reduce focal depth to create a non-measurable area. Thus, the measurable range must be clarified before changing the magnification of the observation system.

Thus, to achieve measurements with measurement accuracy and measurement speed balanced, it is necessary to set parameters determining the measurement accuracy and measurement speed, at optimum values. However, setting these parameters is complicated and requires experience. This is a heavy burden on users.

BRIEF SUMMARY OF THE INVENTION

The present invention is made in view of the above circumstances. It is an object of the present invention to provide a three-dimensional measuring apparatus which is compact and helps construct an excellent system and which enables measurement accuracy to be improved, a method for three-dimensional measurement which enables a user to easily set parameters to sharply reduce the burden on the user, and a program for allowing a computer to execute the method for three-dimensional measurement.

To accomplish the object, the present invention provides a three-dimensional measuring apparatus characterized by comprising a light source which emits an illumination beam, a lattice pattern which makes the illumination beam into a plurality of parallel slit beams to form a lattice pattern image, a projecting optical system which projects the lattice pattern image on a sample so that the image is inclined at a predetermined angle, a lattice pattern projecting section provided on an optical path for the illumination beam and having the lattice pattern and the projecting optical system, a microscope used to observe the lattice pattern image reflected by the sample, and a focusing section which moves the microscope to adjust a focal position with respect to the sample. The present invention also provides a method for three-dimensional measurement characterized by comprising setting parameters for a magnification of an observation system and a maximum measurement range of the sample, determining a lattice pitch on the basis of the set parameters, using a lattice pattern generated with a lattice pitch to pick up a deformed lattice pattern image from the sample, acquiring a picked-up image of each position while shifting the lattice pattern generated with the lattice, over several levels, determining a phase on the basis of the acquired picked-up image of each position, determining a height using a difference between the phase and a basic phase corresponding to the magnification and maximum measurement range included in pre-provided parameters, and displaying the height in a display section.

The present invention can provide a three-dimensional measuring apparatus which is compact and helps construct an excellent system and which enables measurement accuracy to be improved, a method for three-dimensional measurement which enables a user to easily set parameters to sharply reduce the burden on the user, and a program for allowing a computer to execute the method for three-dimensional measurement.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a front view showing a schematic configuration of the three-dimensional measuring apparatus in accordance with the first embodiment;

FIG. 14 is a diagram showing an example of the state of a lattice pattern projected on a sample;

DETAILED DESCRIPTION OF THE INVENTION

Embodiments of the present invention will be described with reference to the drawings.

Figure 1:
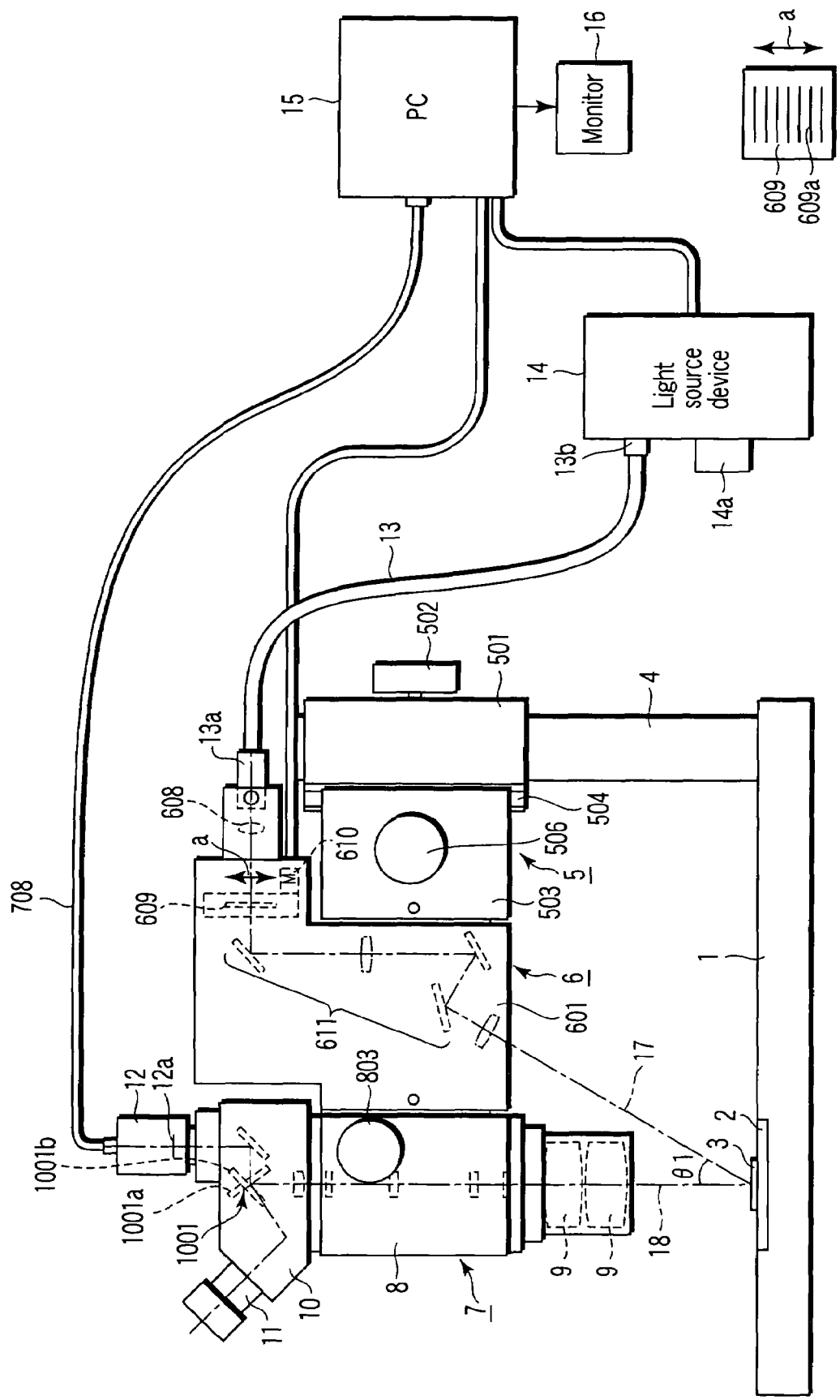
FIG. 1A is a side view showing a schematic configuration of a three-dimensional measuring apparatus in accordance with a first embodiment and FIG. 1B shows a lattice pattern.

FIGS. 1A and 2 show a side view and a front view of a schematic configuration of a three-dimensional measuring apparatus in accordance with a first embodiment of the present invention.

In FIG. 1A, a stage 2 is provided on a base 1. A sample 3 is placed on the stage 2.

A pole 4 is uprightly provided on the base 1. A focusing device 5 is provided on the pole 4. The focusing device 5 is provided with a lattice pattern projecting device 6 that projects a lattice pattern. The lattice pattern projecting device 6 is provided with a stereomicroscope 7.

FIGS. 3A, 3B, 3C, and 3D show a schematic configuration of the focusing device 5.

Figure 3B:
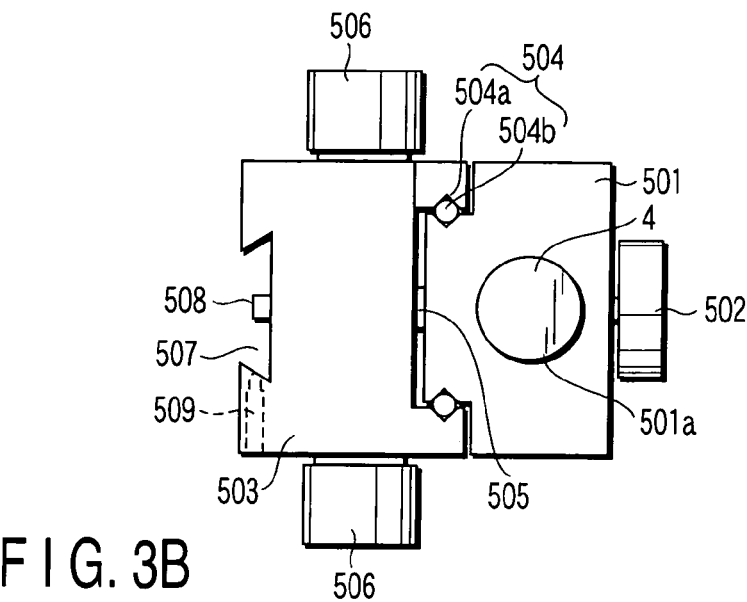
FIG. 3B is a top view of the focusing device.
Figure 3D:
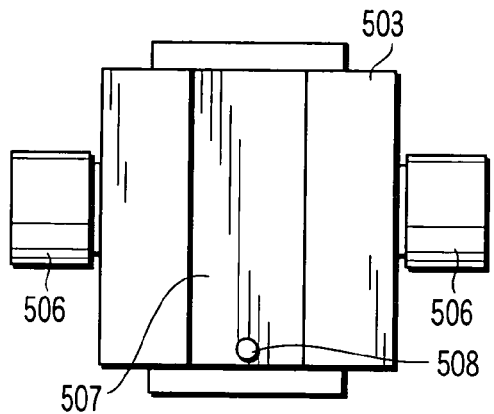
FIG. 3D is a front view of the focusing device.
Figure 3A:
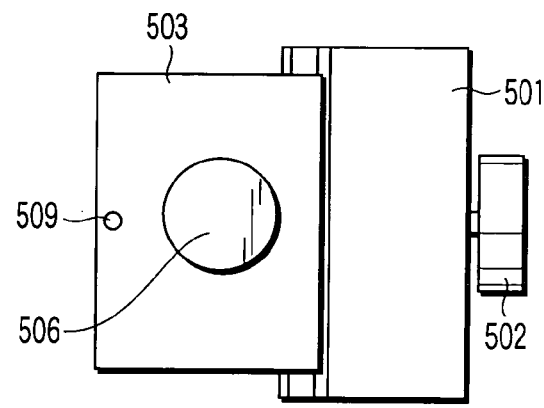
FIG. 3A is a side view of a focusing device.
Figure 3C:
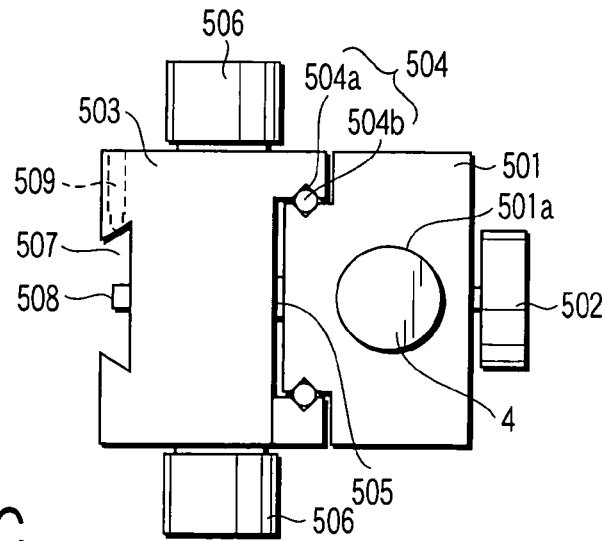
FIG. 3C is a bottom view of the focusing device.

FIG. 3A is a side view the focusing device 5. FIG. 3B is a top view of the focusing device 5. FIG. 3C is a bottom view of the focusing device 5. FIG. 3D is a front view of the focusing device 5.

In FIGS. 3A to 3D, a hole portion 501a is formed in a focusing device main body 501 so that the pole 4 is inserted through the hole portion 501a. A fixing handle 502 is provided on the focusing device main body 501. The fixing handle 502 is rotated in a direction in which it is tightened to enable the focusing device main body 501 to the pole 4.

A moving member 503 is provided on the focusing device main body 501 via a guide portion 504. The guide portion 504 has balls 504b interposed in guide grooves 504a formed at opposite positions in the focusing device main body 501 and moving member 503. This enables the guide portion 504 to move the moving member 503 with respect to the focusing device main body 501. Further, an elevating and lowering mechanism 505 is provided between the focusing device main body 501 and the moving member 503; the elevating and lowering mechanism 505 consists of a pinion and a rack (not shown). A focusing handle 506 is connected to the elevating and lowering mechanism 505. The focusing handle 506 is operated to enable the moving member 503 to move up and down along the pole 4.

The moving member 503 of the focusing device 5 has a sliding female dovetail 507 formed on its side surface located opposite the lattice pattern projecting device 6. The sliding female dovetail 507 constitutes a first installation portion in which the lattice pattern projecting device 6 is installed. A sliding male dovetail 602 described below is connected to the sliding female dovetail 507; the sliding male dovetail 602 is formed on the lattice pattern projecting device 6. In this case, a positioning pin 508 and a fixing screw 509 are arranged in the sliding female dovetail 507. The sliding male dovetail 602 on the lattice pattern projecting device 6 is slidably inserted into the sliding female dovetail 507. The fixing screw 509 fixes an end of the sliding male dovetail 602 abutted against the positioning pin 508.

FIGS. 4A, 4B, 4C, and 4D show a schematic configuration of the lattice pattern projecting device 6.

Figure 4B:
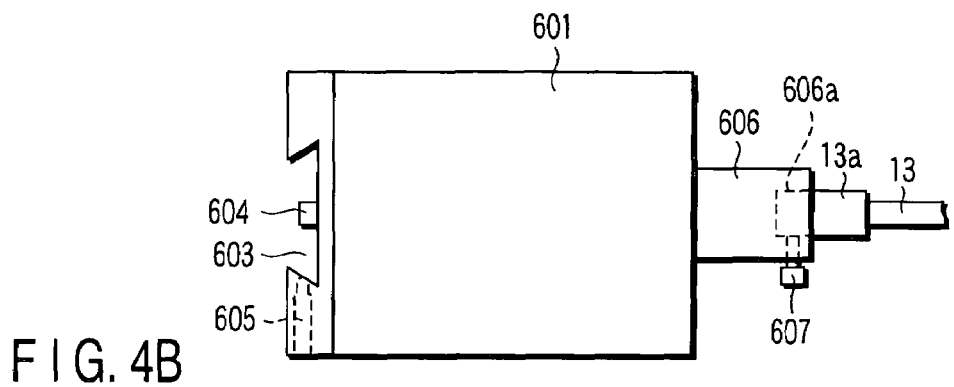
FIG. 4B is a top view of the lattice pattern projecting device.
Figures 4A, 4D:
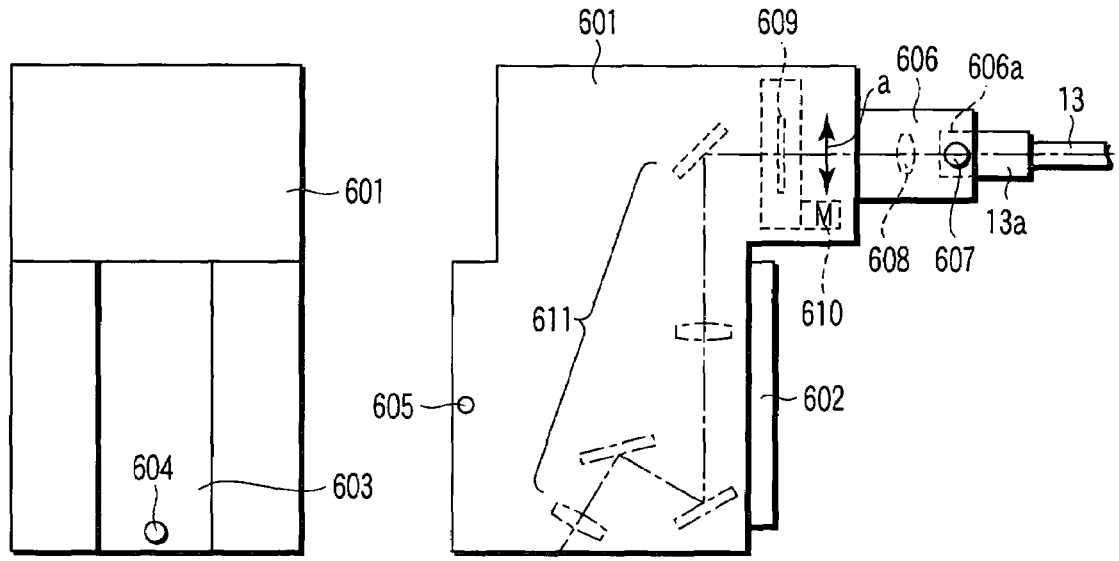
FIG. 4A is a side view of a lattice pattern projecting device.
FIG. 4D is a front view of the lattice pattern projecting device.
Figure 4C:
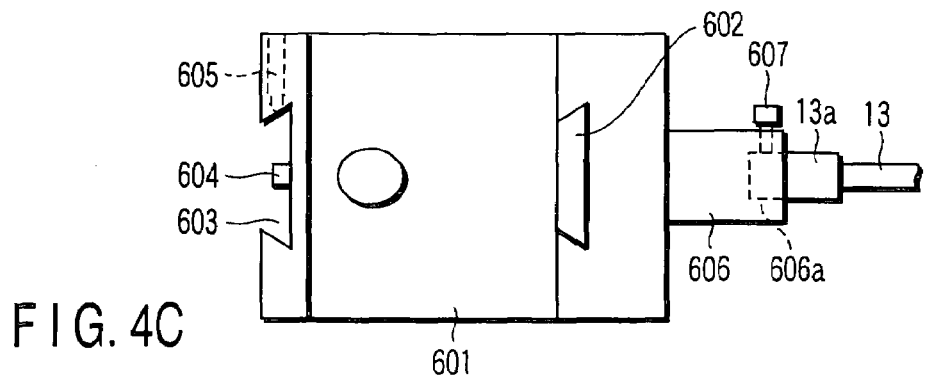
FIG. 4C is a bottom view of the lattice pattern projecting device.

FIG. 4A is a side view of the lattice pattern projecting device 6. FIG. 4B is a top view of the lattice pattern projecting device 6. FIG. 4C is a bottom view of the lattice pattern projecting device 6. FIG. 4D is a front view of the lattice pattern projecting device 6.

In FIGS. 4A to 4D, a lattice pattern projecting device main body 601 has the sliding male dovetail 602 formed on its side surface located opposite the focusing device 5. The sliding male dovetail 602 constitutes a first installation portion installed on the focusing device 5. The sliding male dovetail 602 is slidably inserted into the sliding female dovetail 507, formed in the focusing device 5. As described above, the fixing screw 509 fixes the sliding male dovetail 602 abutted against the positioning pin 508.

Further, the lattice pattern projecting device main body 601 has the sliding female dovetail 603 formed on its side surface located opposite the stereomicroscope 7. The sliding female dovetail 603 constitutes a second installation portion in which the stereomicroscope 7 is installed. A sliding male dovetail 802 described below is connected to the sliding female dovetail 603; the sliding male dovetail 802 is formed on the stereomicroscope 7. In this case, a positioning pin 604 and a fixing screw 605 are arranged in the sliding female dovetail 603. The sliding male dovetail 802 on the stereomicroscope 7 is slidably inserted into the sliding female dovetail 603. The fixing screw 605 fixes an end of the sliding male dovetail 802 abutted against the positioning pin 604.

In the lattice pattern projecting device 6, the lattice pattern projecting device main body 601 has an optical fiber inserting portion 606 provided above its side surface located closer to the focusing device 5. The optical fiber inserting portion 606 has an insertion port 606a at its tip portion. The insertion port 606a fixes an exit end 13a of the optical fiber 13, serving as a light guide. A fixing screw 607 is provided in the insertion port 606a. When the fixing screw 607 is rotated with the emitting end 13a of the optical fiber 13 inserted into the insertion port 606a, the optical fiber 13 can be fixedly positioned.

An illuminating optical system 608 that is a group of lenses is placed inside the optical fiber inserting portion 606 (on an optical path). The illuminating optical system 608 makes beams emitted from the emitting end 13a of the optical fiber 13, almost parallel to one another. The illuminating optical system 608 then guides the almost parallel beams to the interior of the lattice pattern projecting device main body 601.

A lattice pattern 609 is placed inside the lattice pattern projecting device main body 601 (on the optical path). The lattice pattern 609 has slit-like light transmitting portions and light blocking portions alternately formed at pitches set at fixed intervals. The slit-like light transmitting portions are parallel to the light blocking portions. The lattice pattern 609 is uniformly irradiated with beams transmitted through the illuminating optical system 608.

These beams, which are sine wave stripe, pass through the light transmitting portions of the lattice pattern 609. The lattice pattern 609 may include of a transmittance distribution which has sine wave stripe in a specific direction. The lattice pattern 609 may be deformed into a two-dimensional space code.

Further, a driving source 610 is provided on the lattice pattern 609. The driving source 610 moves the lattice pattern 609 a distance equal to predetermined pitches across the pitch. In this case, in the lattice pattern 609, slit-like light transmitting portions 609a are formed at pitches set at fixed intervals in the vertical direction; the light transmitting portions 609a extend along a horizontal direction as shown in FIG. 1B. The driving source 610 can move the lattice pattern 609 in a pitch direction orthogonal to the light transmitting portions 609a, that is, the vertical direction shown by arrow a in the figure.

As a specific example, a liquid crystal lattice is used as the lattice pattern 609. The lattice is driven by a control driver (not shown) corresponding to the driving source 610.

A projecting optical system 611 is placed in the optical path transmitted through the lattice pattern 609. The projecting optical system 611 projects a lattice pattern image via a projecting optical path 17 (see FIG. 1A) so that the image is inclined at a predetermined angle to the sample 3, that is, a predetermined projection angle θ1; the lattice pattern image is formed by the lattice pattern 609 and has bright and dark areas.

In this case, the projecting optical system 611 constitutes a two-sided telecentric optical system for the object (lattice pattern 609) and image (sample 3). The two-sided telecentric optical system is used because it makes the size (magnification) of the lattice pattern image before a focal plane the same as that after the focal plane. This prevents measuring errors resulting from a change in the size of the lattice pattern image.

Description will be give with reference to FIG. 1A again. The stereomicroscope 7 is connected to the lattice pattern projecting device 6. In this case, the stereomicroscope 7 has a stereomicroscope body 8.

FIGS. 5A, 5B, 5C, and 5D show a schematic configuration of the stereomicroscope body 8.

Figure 5B:
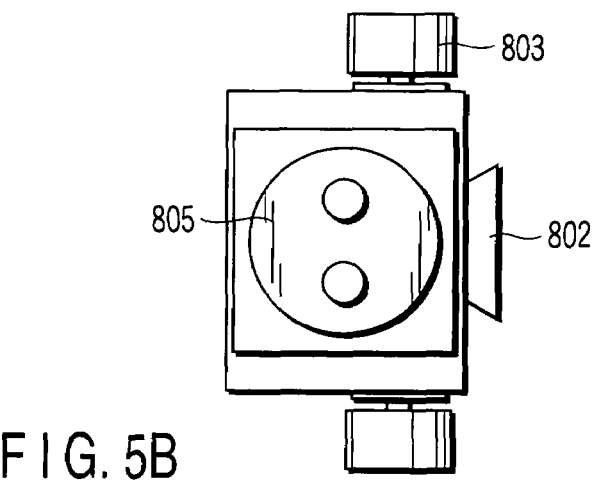
FIG. 5B is a top view of the zoom mirror.
Figure 5D:
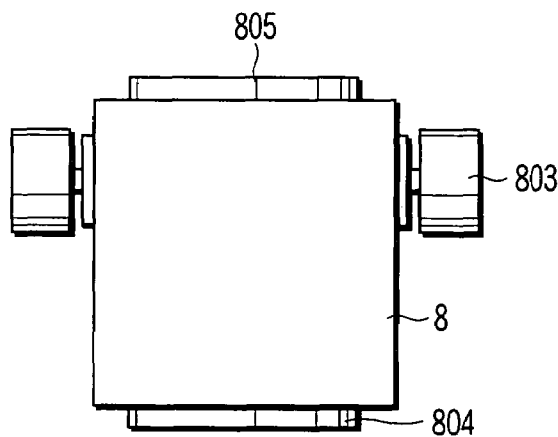
FIG. 5D is a front view of the zoom mirror.
Figure 5A:
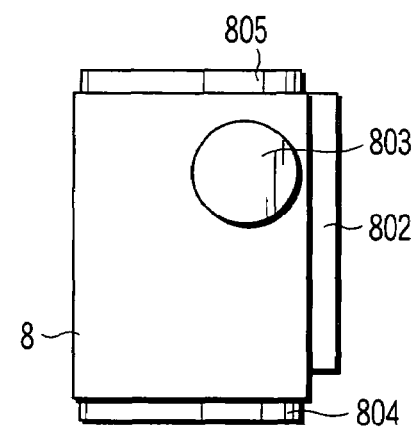
FIG. 5A is a side view of a zoom mirror.
Figure 5C:
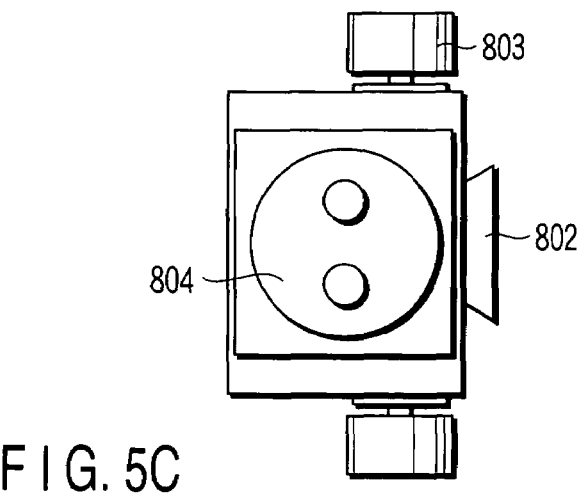
FIG. 5C is a bottom view of the zoom mirror.

FIG. 5A is a side view of the stereomicroscope body 8. FIG. 5B is a top view of the stereomicroscope body 8. FIG. 5C is a bottom view of the stereomicroscope body 8. FIG. 5D is a front view of the stereomicroscope body 8.

In FIGS. 5A to 5D, the stereomicroscope body 8 has a sliding male dovetail 802 formed on its side surface located opposite the lattice pattern projecting device 6. The sliding male dovetail 802 constitutes a second installation portion installed on the lattice pattern projecting device 6. The sliding male dovetail 802 is slidably inserted into the sliding female dovetail 603, formed in the lattice pattern projecting device 6. As described above, the fixing screw 605 fixes the sliding male dovetail 802 abutted against the positioning pin 604.

In this case, the sliding male dovetail 802 of the stereomicroscope body 8 has compatibility such that it can also be attached to the sliding female dovetail 507 in the focusing device 5. This enables the stereomicroscope body 8 to be fixedly connected directly to the sliding female dovetail 507 in the focusing device 5.

The stereomicroscope body 8 is provided with a zoom handle 803 that is operated to enable the magnification of the stereomicroscope body 8 to be varied.

A threaded portion 804 that is an objective lens attachment portion is formed on a bottom surface of the stereomicroscope body 8. A round dovetail 805 that is a lens barrel attachment portion is formed on a top surface of the stereomicroscope body 8.

Referring back to FIG. 1A, an objective lens 9 is installed at a lower end of the stereomicroscope body 8. In this case, the objective lens 9 uses a screwing method in which the objective lens 9 is screwed around the threaded portion 804 of the stereomicroscope body 8 for installation. The objective lens 9 is placed above the sample 3. The objective lens 9 can be focused on the sample 3 by operating the focusing device 5 to move the stereomicroscope body 8 up and down to vary the relative distance between the objective lens 9 and the sample 3.

A lens barrel 10 is installed at an upper end of the stereomicroscope body 8 via the round dovetail 805 of the stereomicroscope body 8. The lens barrel 10 consists of three lenses. The lens barrel 10 is provided with an ocular lens 11 serving as an observation section and a TV camera 12 serving as an image pickup section. An optical path switching section 1001 is provided inside the lens barrel 10. The optical path switching section 1001 is placed on an image pick-up optical path 18 to which beams reflected by the sample 3 are guided via the objective lens 9. The optical path switching section 1001 has optical path switching mirrors 1001a and 1001b as optical elements that can be inserted into and removed from the image pick-up optical path 18. When the optical path switching mirror 1001a is inserted into the image pick-up optical path 18, the optical path switching section 1001 allows the ocular lens 11 to form the beams reflected by the sample 3 into a deformed lattice pattern image, which can then be visually checked. When the optical path switching mirror 1001a is removed from the image pick-up optical path 18 and the optical path switching mirror 1001b is inserted into the image pick-up optical path 18, the optical path switching section 1001 forms a deformed lattice pattern image on an image picking-up surface 12a of the TV camera 12.

In the present embodiment, the two mirrors, the optical switching mirrors 1001a and 1001b, are used to switch the optical path. However, the optical path may be switched using only one mirror.

On the other hand, the optical fiber 13 has a light source device 14 connected to its entrance end 13b. The light source device 14 uses for example, a halogen lamp, a xenon lamp, or an LED array as a light source. The light source device 14 is also provided with a light quantity adjustment volume 14a that adjusts the quantity of light emitted by the light source.

A personal computer (for example, an image processing apparatus; referred to as a PC below) 15 that processes images is connected to the TV camera 12. The PC 15 arithmetically processes picked-up images from the TV camera 12 to determine the three-dimensional surface shape of the sample 3. Further, a monitor 16 is connected to PC 15. The monitor 16 displays the results of arithmetic processing executed on picked-up images by PC 15. Moreover, the light source device 14 and the driving source 610 are connected to PC 15. In the present embodiment the quantity of light from the light source device 14 can be adjusted and the driving source 610 can control movement of the lattice pattern 609, in accordance with instructions from PC 15.

Now, description will be given of operations of the present embodiment configured as described above.

Beams emitted by the light source device 14 are guided to the lattice pattern projecting device 6 via the optical fiber 13. The beams are made parallel when transmitted through the illuminating optical system 608. The lattice pattern 609 is then uniformly irradiated with the beams. The beams transmitted through the light transmitting portions 609a of the lattice pattern 609 are transmitted through the projecting optical system 611. The beams are then projected on the sample 3 through the projecting optical path 17 so as to incline at a predetermined angle. A lattice pattern is obtained which has dark and bright areas.

As indicated above, the lattice pattern 609 may include of a transmittance distribution which has sine wave stripe in a specific direction, or may be deformed into a two-dimensional space code. In either case, the lattice pattern 609 is projected from the projecting optical path 17 to the sample 3, inclined at a predetermined angle.

The lattice pattern (sine wave stripe) projected on the sample 3 is reflected by a surface of the sample 3. The reflected beams are transmitted through the objective lens 9 and guided to the image pick-up optical path 18. In this case, if the optical path switching mirror 1001a of the optical path switching section 1001 is inserted into the image pick-up optical path 18, the beams reflected by the sample 3 are formed into a deformed lattice pattern image on the ocular lens 11; the image can then be visually checked. Further, when the optical path switching mirror 1001a is moved off from the image pick-up optical path 18 and the optical path switching mirror 1001b is inserted into the optical path, beams scattered by the sample 3 are formed into a deformed lattice pattern image on the image picking-up surface 12a of the TV camera 12. The image is then picked up. If the lattice pattern image projected on the sample 3 is not observed during visual checks, the following method may be used: the lattice pattern 609 is located off the optical path, the beams from the light source device 14 are blocked, or the light source is extinguished.

Such a deformed lattice pattern image is picked up a number of times while the driving source 610 is moving (shifting) the lattice pattern 609 a distance equal to predetermined pitches. In this case, the lattice pattern image projected on the sample 3 moves the distance equal to the predetermined pitches in a direction orthogonal to the slit-like light transmitting portions 609a as the lattice pattern 609 is moved by the driving source 610.

The image picked up by the TV camera 12 is sent to PC 15 via a cable 708. PC 15 then processes the image to determine the three-dimensional surface shape of the sample 3. The monitor 16 then displays for example, the results of arithmetic processing executed on the picked-up image by PC 15.

Accordingly, by combining the lattice pattern projecting device 6, formed as a unit, with the stereomicroscope 7, it is possible to provide a compact three-dimensional measuring apparatus. By combining the lattice pattern projecting device 6 with a particularly small-sized stereomicroscope, it is possible to provide a more compact three-dimensional measuring apparatus.

The lattice pattern projecting device 6, formed as a unit, can be installed on and removed from the common stereomicroscope 7. Consequently, a measuring system can be inexpensively and easily constructed without the need to modify the stereomicroscope 7 so that the stereomicroscope 7 can be dedicated to three-dimensional measurements.

Moreover, the lattice pattern projecting device 6 can be installed on and removed from a side surface of the stereomicroscope 7 and need not be of the intermediate lens barrel type. Accordingly, as in the case of common stereomicroscopes, any of other intermediate lens barrels, for example, a coaxial epi-illumination type, can be installed without any limitations. Therefore, the present invention is effective in constructing an excellent system. Further, as the lattice pattern projecting device 6 is not of the intermediate lens barrel type, eye points are prevented from rising. This is ergonomically preferable.

Furthermore, the lattice pattern projecting device 6 is formed as a unit and is thus independent. Consequently, the lattice pattern projecting device 6 is not affected by the inward angle of the stereomicroscope 7, in which the projection angles of the lattice pattern resulting from the measurement accuracy are combined. The lattice pattern projecting device 6 can thus be configured for an angle that meets the object.

Moreover, the ocular lens 11 of the stereomicroscope 7 enables the sample 3 to be visually three-dimensionally checked. In addition, the image picked up by the TV camera 12 can be used to measure the three-dimensional shape on the basis of the lattice pattern projection method. Consequently, during a parts inspection process in an actual manufacturing plant, the following operation is possible: normal inspections are carried out through visual checks, and if any defect is found, an image of the defective part is picked up on the basis of the lattice pattern projection method to instantaneously measure the three-dimensional shape, thus enabling data for defect analysis to be acquired at the site.

Additionally, the conventional measurement-dedicated apparatus forces the user to observe the image on a monitor screen. Accordingly, it is difficult to understand the uneven shape of the sample 3 without actually measuring the three-dimensional shape. However, a combination of the apparatus with the stereomicroscope 7 enables the uneven shape of the sample 3 to be visually checked. This enables the situation to be flexibly dealt with in accordance with the application. For example, if it is unnecessary to numerically determine the shape using three-dimensional images, the measuring operation is omitted with only visual checks executed.

The present invention is not limited to the above embodiment. In implementation, many variations may be made to the embodiment without departing from the spirit of the present invention.

For example, in the present embodiment, the stereomicroscope 7 is used. However, the present invention is not limited to this. Any other microscopes, for example, a video microscope, may be used.

Now, with reference to the drawings, description will be given of a second embodiment in accordance with the present invention.

The same members as those in the first embodiment have the same reference numerals and their detailed description is omitted.

Figure 6:
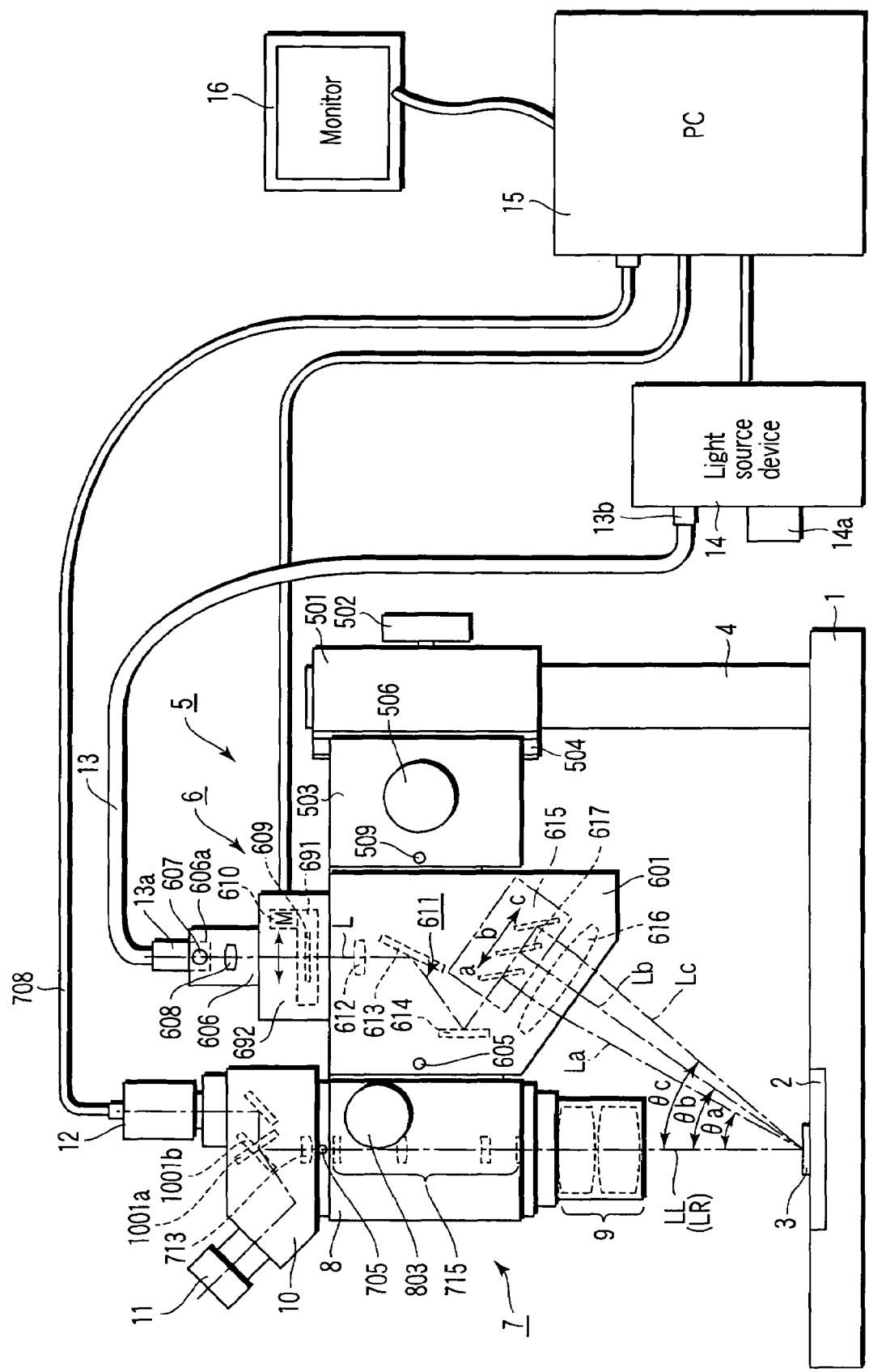
FIG. 6 is a side view showing a schematic configuration of a three-dimensional measuring apparatus in accordance with a second embodiment of the present invention.
Figure 7:
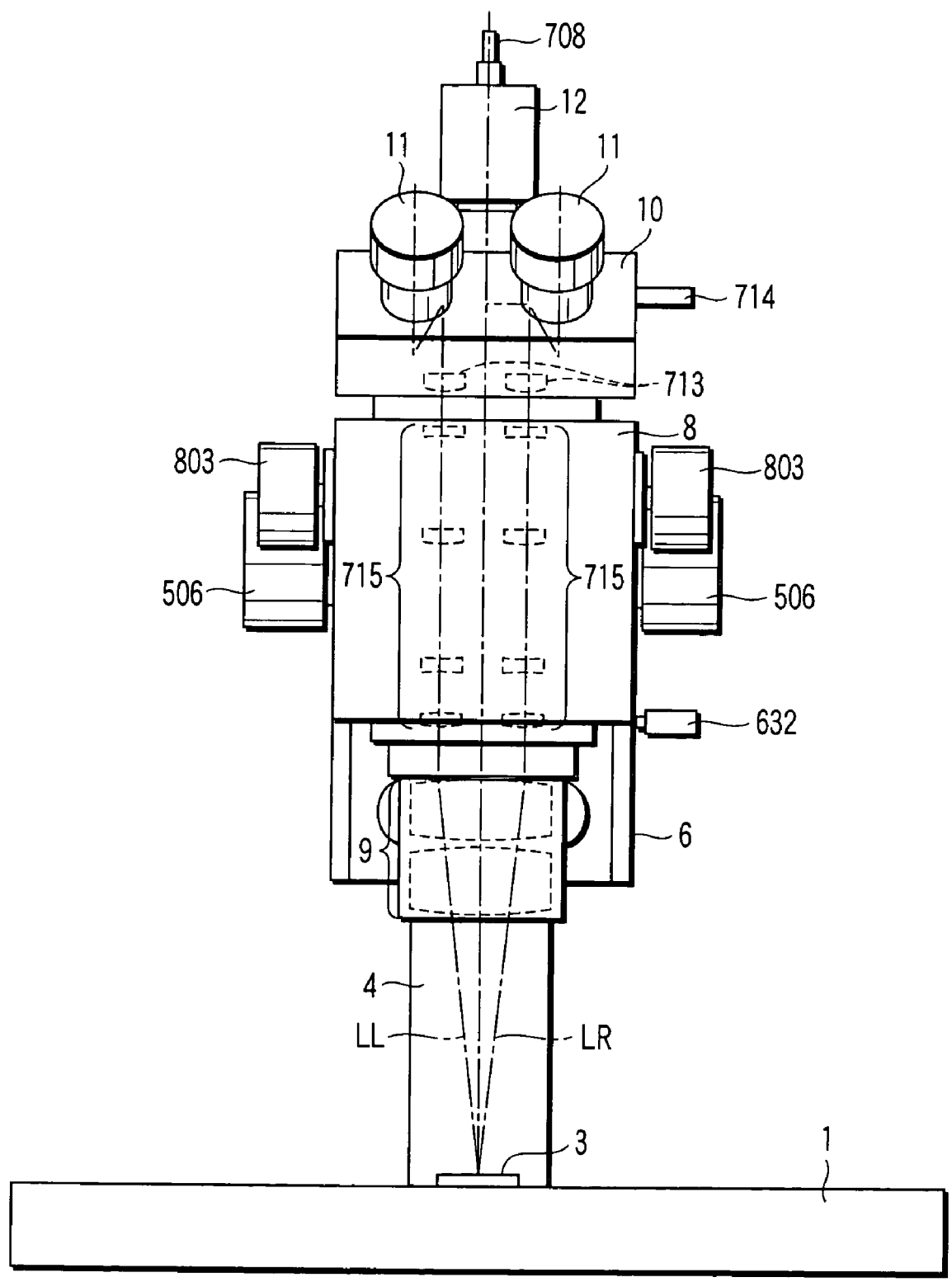
FIG. 7 is a front view showing a schematic configuration of the three-dimensional measuring apparatus in accordance with the second embodiment of the present invention.
Figure 8:
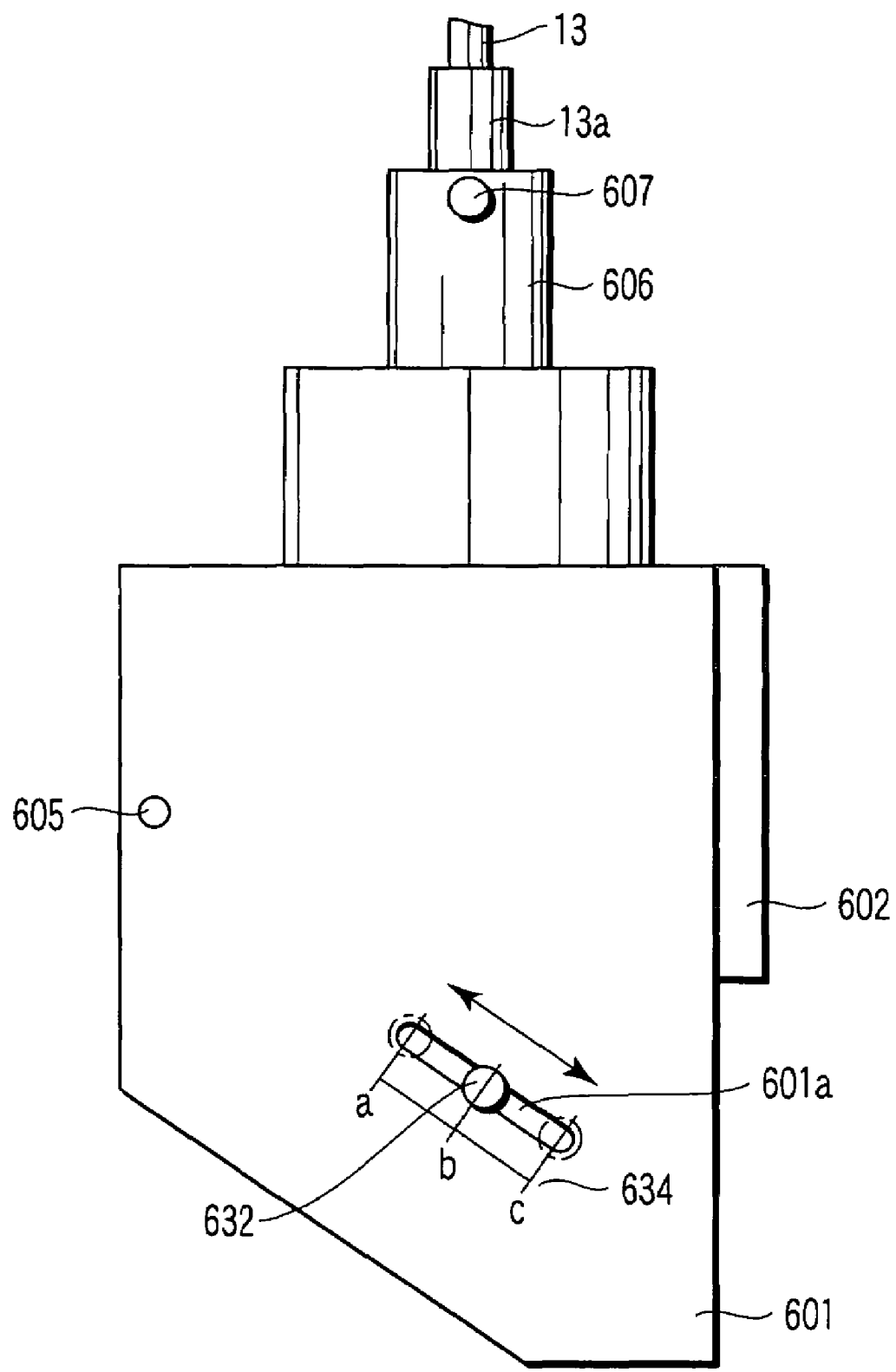
FIG. 8 is a side view of the lattice pattern projecting device.
Figure 9:
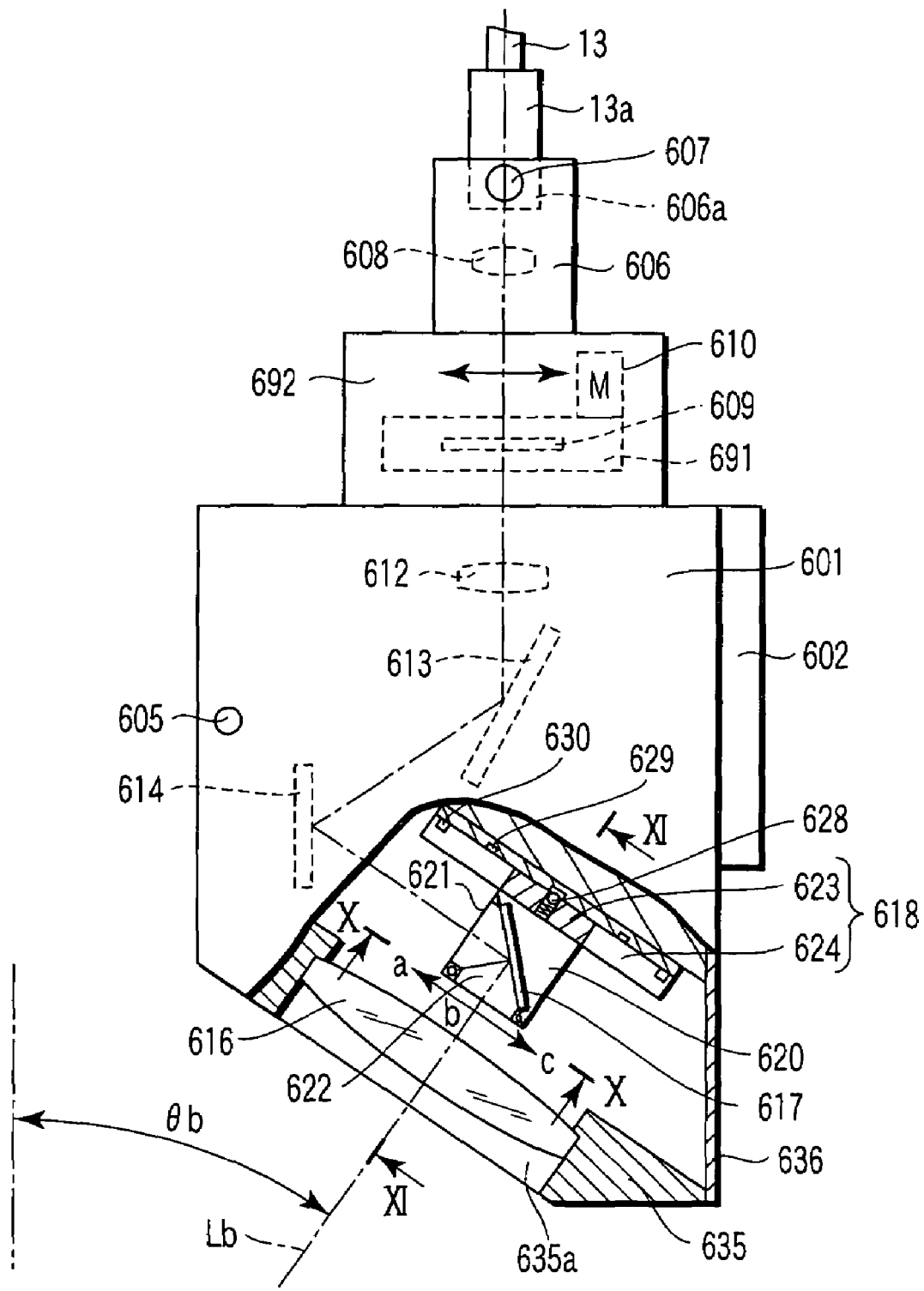
FIG. 9 is a partly sectional side view of the lattice pattern projecting device.
Figure 10:
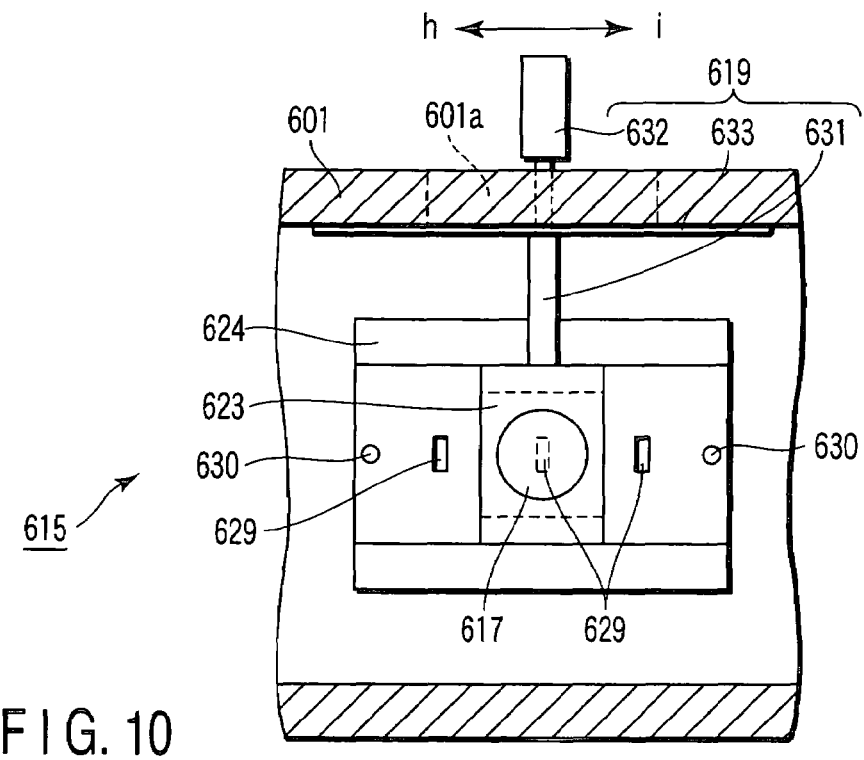
FIG. 10 is a sectional view taken along line AA' in FIG. 9.
Figure 11:
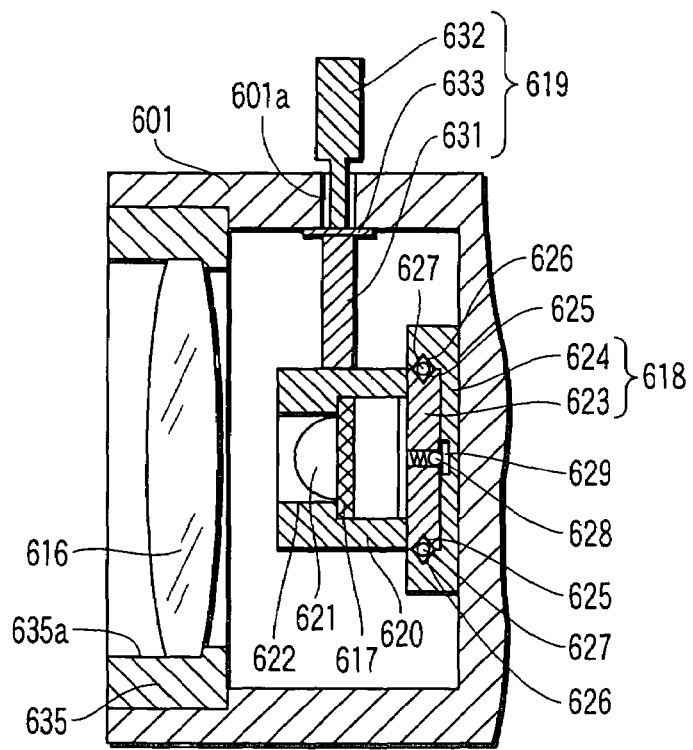
FIG. 11 is a sectional view taken along line BB' in FIG. 9.
Figure 12:
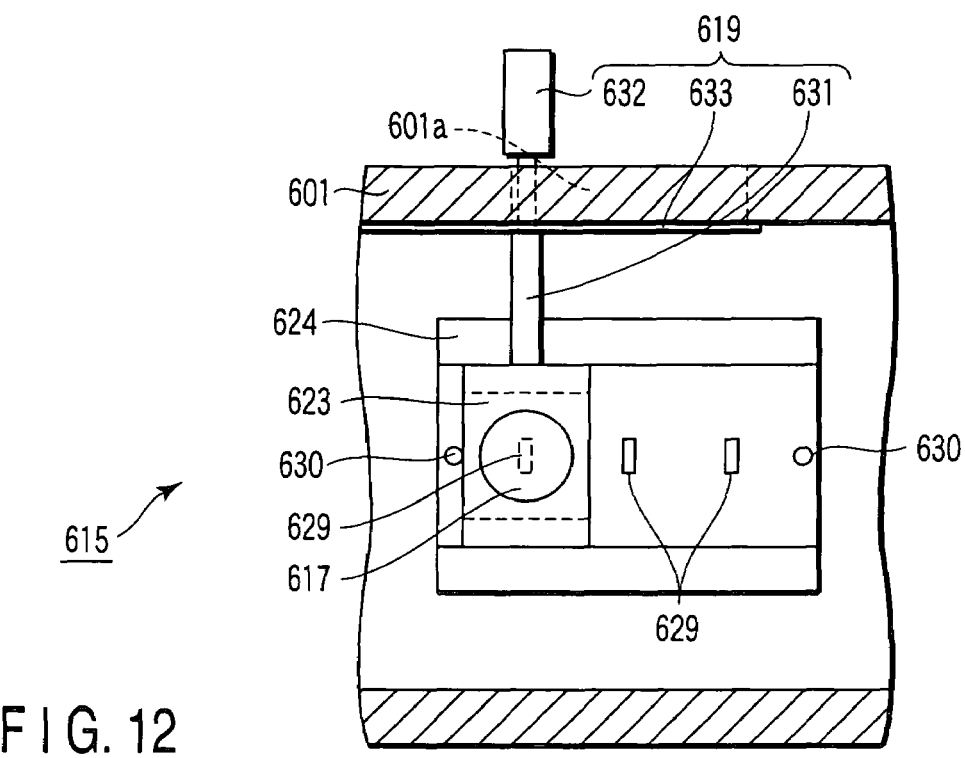
FIG. 12 is a sectional view taken along line AA' in FIG. 9.
Figure 13:
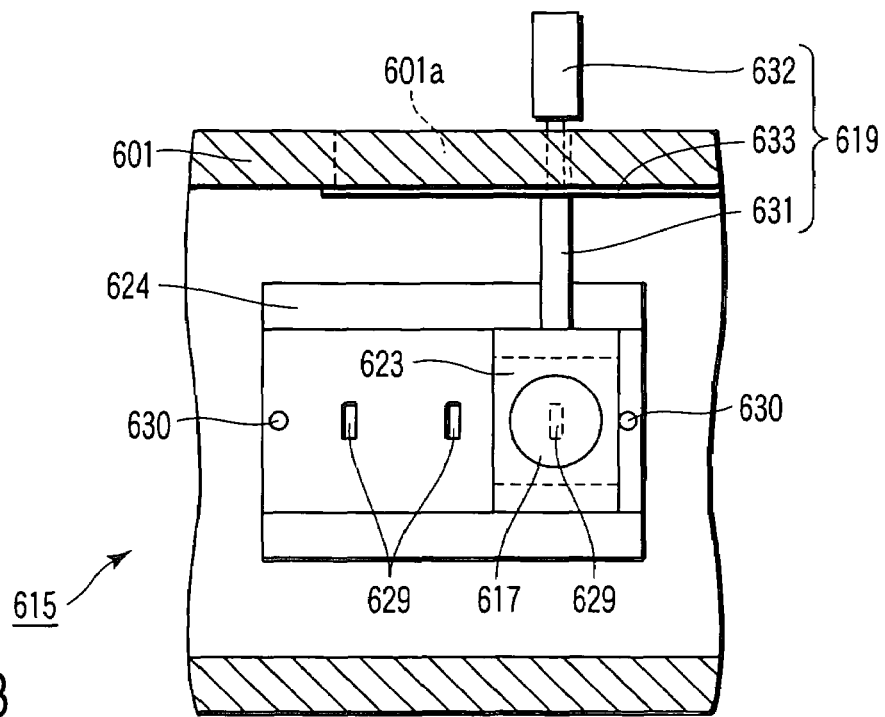
FIG. 13 is a sectional view taken along line AA' in FIG. 9.

FIGS. 6 to 14 show a three-dimensional measuring apparatus employing the lattice pattern projection method according to the second embodiment of the present invention. FIGS. 6 and 7 are a side view and a front view of a schematic configuration of a three-dimensional measuring apparatus in accordance with the second embodiment of the present invention. FIG. 8 is a right side view of the lattice pattern projecting device. FIG. 9 is a partly sectional right side view of the lattice pattern projecting device. FIG. 10 is a sectional view taken along line AA' in FIG. 9. FIG. 11 is a sectional view taken along line BB' in FIG. 9. FIG. 12 is a sectional view taken along line AA' in FIG. 9. FIG. 13 is a sectional view taken along line AA' in FIG. 9. FIG. 14 is a diagram showing an example of the state of a lattice pattern projected on a sample.

In FIGS. 6 and 7, the sample 3 as an object to be measured is placed on the stage 2. In this case, the sample 3 has a projecting portion 3a in its central portion and thus has a convex cross section as shown in FIG. 14.

The focusing device 5 has the focusing device main body 501 with a hole portion (not shown) through which the pole 4 is inserted. The fixing handle 502 is provided on the focusing device main body 501. The fixing handle 502 is rotated in the direction in which it is tightened to enable the focusing device main body 501 to the pole 4.

The moving member 503 is provided on the focusing device main body 501 via the guide portion 504. The guide portion 504 enables the moving member 503 to move with respect to the focusing device main body 501. Further, the elevating and lowering mechanism is provided between the focusing device main body 501 and the moving member 503; the elevating and lowering mechanism consists of a pinion and a rack and the focusing handle 506 is connected to the elevating and lowering mechanism. The focusing handle 506 is operated to enable the moving member 503 to move up and down along the pole 4.

The lattice pattern projecting device 6 is provided on the moving member 503 of the focusing device 5. The lattice pattern projecting device 6 has the sliding male dovetail 602 provided on a rear surface of the lattice pattern projecting device main body 601 as shown in FIG. 8. The sliding male dovetail 602 is detachably assembled and fixed to a female dovetail (not shown) in the focusing device 5 using the fixing screw 509 (see FIG. 6).

The lattice pattern projecting device 6 is provided with the lattice pattern projecting device main body 601, the optical fiber inserting section 606 in which beams emitted by the light source device 14 are taken, and an optical modulating section 692.

The optical fiber 13 is connected to the light source device 14. The ends of the optical fiber 13 constitute the exit end 13a and entrance end 13b. The light source device 14 is provided with the light quantity adjustment volume 14a that adjusts the quantity of light in the beams.

The optical fiber insertion portion 606 is provided with the insertion port 606a in which the exit end 13a of the optical fiber 13 is fitted, and the fixing volume 607 used to fix the exit end 13a fitted into the insertion port 606a. In the optical fiber insertion portion 606, the illuminating optical system 608 is provided on the optical path for beams emitted from the exit end 13a of the optical fiber 13; the illuminating optical system 608 uniformly illuminates the entire lattice pattern 609.

The optical modulation section 692 is provided behind the illuminating optical system 608. The optical modulation section 692 is provided with an optical modulation element 691 having the lattice pattern 609, serving as an optical modulation section. The lattice pattern 609 has slit openings or light transmitting portions and light blocking portions alternately arranged in one-dimensional direction to form such a lattice pattern image 20 as shown in FIG. 14 on the sample 3. The slit openings or light transmitting portions and the light blocking portions serve to provide a variable-density pattern shaped like a sine wave. The optical modulation section 692 is provided with the driving source 610. The driving source 610 moves the lattice pattern 609 in directions of the arrows shown in FIG. 6. The driving source 610 moves the entire lattice pattern image 20 on the sample 3 shown in FIG. 14, in the direction of the arrows shown in FIG. 6, to enable the phase of the sine waveform to be shifted. The optical modulation element 691 may be for example, a liquid crystal lattice. With a liquid crystal lattice, to move the lattice pattern 609, a control driver (not shown) may be used to vary the lattice pattern in the liquid crystal lattice. The lattice pattern 609 may include of a transmittance distribution which has sine wave stripe in a specific direction. The lattice pattern 609 may be deformed into a two-dimensional space code.

The lattice pattern projecting device main body 601 is provided with the projecting optical system 611 that projects beams (lattice pattern image) transmitted through the lattice pattern 609, on the sample 3 so that the beams are inclined at a predetermined angle. The projecting optical system 611 has an objective lens 612 serving as an afocal optical element that makes afocal the beams transmitted through the lattice pattern 609, for example, reflection mirrors 613 and 614 that are optical members varying the direction in which the beams transmitted through the objective lens 612 travel, a projection angle switching section 615 that can vary the angle at which the lattice pattern image 20 is projected on the sample 3, and an image forming lens 616 serving as a condensing optical element to form a lattice pattern image 20 on the sample 3.

In this case, the reflection mirrors 613 and 614 are adapted to guide beams L transmitted through the objective lens 612, in the vertical direction to for example, the optical axis Lb of the image forming lens 616. Further, as shown in FIGS. 8 to 13, the projection angle switching section 615 has a mirror 617 serving as an optical member, a moving member 623 that holds the mirror 617 so that it is linearly movable, a guide section 618 having a guide frame 624, and an operation section 619 that performs an angle switching operation. In this case, the mirror 617 is movable along an optical path for incident afocal beams guided to the mirror 617 by the moving guide section 618 via the reflection mirrors 613 and 614. Further, the mirror 617 is placed at an angle such that beams guided by the reflection mirrors 613 and 614 are deflected toward the central axis of the image forming lens 616, that is, the optical axis Lb. The mirror 617 is held by a holding frame 620. The holding frame 620 is provided with diaphragms 621 and 622 on an incidence side on which beams enter the mirror 617 and an exit side on which the beams exit the mirror 617. The diaphragms 621 and 622 limit the beams L incident on the image forming lens 616.

The holding frame 620 is provided in the moving member 623 of the guide section 618. The moving member 623 is supported by a guide frame 624. The moving member 623 is movable parallel to the vertical direction to the optical axis of the image forming lens 616 along the optical path for beams guided by the reflection mirrors 613 and 614. In this case, as shown in FIG. 11, the moving member 623 has guide grooves 625 on its opposite side surfaces in a direction in which it moves. The guide frame 624 has guide grooves 626 formed in its side surfaces corresponding to the guide grooves 625 in the moving member 623. Balls 627 are interposed between the guide grooves 625 and 626. The balls 627 enable the moving member 623 to linearly move smoothly.

A ball plunger 628 is embedded in the moving member 623. A groove portion 629 is formed in the guide frame 624 in association with the ball plunger 628. This enables the moving member 623 to be positioned with the ball plunger 628 embedded in the groove portion 629. In this case, the groove portion 629 is formed at a plurality of (in the illustrated example, three) positions along the moving direction (in the figure, the direction from h to i or vice versa) of the moving member 623 as shown in FIG. 10. A regulating pin 630 shown in FIG. 9 prevents the moving member 623 from slipping off from the guide frame 624.

A connection bar 631 is provided on the operation section 619 and has the moving member 623 fixed to its end as shown in FIG. 10. The connection bar 631 is extended from the moving member 623 to the vicinity of an opening slot 601a formed in the lattice pattern projecting device main body 601. An operation volume 632 is provided at an end of the connection bar 631. The operation volume 632 projects toward the exterior of the lattice pattern projecting device main body 601 via the opening slot 601a.

The operation volume 632 is externally operated by the user to move the moving member 623 (holding frame 620). The connection bar 631 is provided with a baffle 633. The baffle 633 is sized to cover the opening slot 601a. When the operation volume 632 is operated to move the connection bar 631 through the opening slot 601a, the baffle 633 prevents external beams from entering the lattice pattern projecting device main body 601 from entering the lattice pattern projecting device main body 601 via the opening slot 601a.

An indicator 634 is provided on a side surface of the lattice pattern projecting device main body 601 in proximity to the opening slot 601a as shown in FIG. 8. The indicator 634 shows a projection angle corresponding to movement of the operation volume 632. The indicator 634 displays positions a, b, and c at which the moving member 623 is located in the plurality of (three) groove portions 629.

On the other hand, the above image forming lens 616 is fixed to a lens frame 635 as shown in FIG. 9. An opening hole 635a is formed in the lens frame 635 so that the beams L from the projecting optical system 611 can pass through the opening hole 635a. The lens frame 635 is fixed to the lattice pattern projecting device main body 601.

A cover portion 636 covers an opening formed in a rear surface of the lattice pattern projecting device main body 601. The cover portion 636 can be removed to allow various optical elements inside the lattice pattern projecting device main body 601 to be adjusted or to allow maintenance inspections to be carried out.

Referring back to FIG. 6, the stereomicroscope 7 is connected to the lattice pattern projecting device main body 601 of the lattice pattern projecting device 6. A sliding male dovetail (not shown) is provided on the rear surface portion of the stereomicroscope 7. The stereomicroscope 7 is detachably assembled in a female dovetail (not shown) in the lattice pattern projecting device main body 601. The stereomicroscope 7 is fixed to the lattice pattern projecting device main body 601 using a fixing screw 605.

The stereomicroscope 7 is provided with the stereomicroscope body 8 as shown in FIGS. 6 and 7. The stereomicroscope body 8 is provided with observing optical system 715 constituting two laterally parallel observing optical paths LR and LL as shown in FIG. 7. In this case, the optical paths LR and LL extend off the optical axis of the objective lens 9 and cross each other on the sample 3. The stereomicroscope body 8 is also provided with a zoom handle 803. The zoom handle 803 can be operated by the user to vary the magnification of the stereomicroscope body 8.

The stereomicroscope body 8 has a plurality of the objective lenses 9 installed at its lower end and the lens barrel 10 provided at the top of the stereomicroscope body 8. The lens barrel 10 is detachably assembled to the stereomicroscope body 8 via a round dovetail (not shown) and fixed to the stereomicroscope body 8 using a screw 705. Further, an image forming lens 713 and optical path switching mirrors 1001a and 1001b are accommodated in the lens barrel 10. The lens barrel 10 has two ocular lenses attached to its front surface and the TV camera 12 assembled to its top surface and serving as an image pickup section. The TV camera 12 is connected to PC 15 via a cable 708. PC 15 processes picked-up images of the TV camera 12 and thus the three-dimensional surface shape of the sample 3. The monitor 16 is connected to PC 15. The monitor 16 displays for example, the results of arithmetic processing executed on the picked-up images by PC 15.

A switching volume 714 is provided on a side surface of the lens barrel 10. The switching volume 714 allows the optical path switching mirrors 1001a and 1001b in the lens barrel 10 to move to switch the optical path. In this case, the user can switch the left optical path LL to the ocular lens 11 side for visual checks or to the TV camera 12 side for image pickup.

Now, description will be given of operations of the three-dimensional measuring apparatus configured as described above.

First, the focusing handle 506 of the focusing device 5 shown in FIG. 6 is operated to move the moving member 503 up and down along the guide section 504 to make the sample 3 in focus. Further, the light quantity adjustment volume 14a of the light source device 14 is operated to adjust the quantity of light to an optimum value.

In this state, beams emitted by the light source device 14 are guided from the exit end 13a of the optical fiber 13 to the optical fiber insertion portion 606. The guided beams are incident on an optical modulation section 692 through the illuminating optical system 608. The front surface of the lattice pattern 609 in the optical modulation element 691 is then uniformly irradiated with the beams. The beams L having passed through the lattice pattern 609 are made afocal by the objective lens 612 in the projecting optical system 611. The beams are then reflected by the reflection mirrors 613 and 614 and guided in the vertical direction to the optical axis of the image forming lens 616.

The beams L are further reflected by the mirror 617 of the projection angle switching section 615 and deflected across the optical axis of the image forming lens 616. The beams thus pass through the image forming lens 616. On this occasion, the diaphragms 621 and 622 of the holding frame 620 cut those beams which do not enter the image forming lens 616. The beams having passed through the image forming lens 616 are condensed and formed into a lattice pattern image 20 (sine wave stripe) on the sample 3 as shown in FIG. 14.

The lattice pattern image 20 on the sample 3 passes through the objective lens 9 in the stereomicroscope 7 and then the left optical path LL. The lattice pattern image 20 is then condensed by the image forming lens 713 in the lens barrel 10. In this case, the user operates the switching volume 714 of the lens barrel 10 to move the optical path switching mirrors 1001a and 1001b to switch the optical path LL to the TV camera 12 side. Then, the lattice pattern image 20 condensed by the image forming lens 713 is picked up by an image pickup element (not shown) in the TV camera 12. The lattice pattern image 20 is loaded into PC 15 through the cable 708 and then displayed on the monitor 16 as measurements.

In this state, the driving source 610 drives the optical modulation element 691 to move the lattice pattern in the direction of the arrow shown in FIG. 6. This allows the phase of the lattice pattern 609 to be changed to move the entire lattice pattern image 20 on the sample 3 shown in FIG. 14, in the direction of the illustrated arrow. The lattice pattern image 20 is similarly loaded into PC 15. The phase of the lattice pattern 609 is thus shifted a number of times. Each of the resulting lattice pattern images 20 is loaded into PC 15. At the same time, information on the projection angle of each lattice pattern image 20 is input and converted into height on the basis of a well-known phase shift method. As a result, the three-dimensional image of the sample 3 is obtained.

In this case, to convert the information into height on the basis of the phase shift method, the image is projected so that a variable-density pattern varies in a direction in which a projecting optical axis A is inclined as shown in FIG. 14. On this occasion, the projecting optical axis A of the lattice pattern 609 is inclined at an angle θ to the image pick-up optical axis B (left optical path LL) of the stereomicroscope 7.

Now, description will be given of a method for varying the projection angle of the lattice pattern 609.

In this case, as shown in FIGS. 6 and 9, provided that the mirror 617 in the projection angle switching section 615 is placed on the optical axis Lb of the image forming lens 616 in the lattice pattern projecting device 6, the projection angle on the sample 3 is θb to the image pick-up optical axis of the stereomicroscope 7, that is, the left optical path LL.

In this state, as shown in FIG. 10, the operation volume 632 of the operation section 619 is moved in the illustrated direction h along the opening slot 601*a*. Then, the moving member 623 moves along the guide frame 624 to position the ball plunger 628 so that it is fitted into the groove portion 629 located in the left of the figure (see FIG. 12). On this occasion, a side surface of the moving member 623 abuts against the regulating pin 630. The regulating pin 630 thus prevents the moving member 623 from slipping off from the guide frame 624.

If the ball plunger 628 is thus fitted into the groove portion 629 located in the left of FIG. 12, that is, the mirror 617 is at the position a in FIG. 6, the beams L are displaced parallel to the central axis of the image forming lens 616, that is, the optical axis Lb, before incidence. Thus, the projecting optical axis switches to La and the projection angle on the sample 3 switches to θa to the image pick-up optical axis of the stereomicroscope 7, that is, the left optical path LL.

In this case, even with the movement of the operation volume 632 of the operation section 619, since the opening slot 601*a* is covered with the baffle 633, it is possible to prevent external beams from advancing into the lattice pattern projecting device 6.

On the other hand, when the operation volume 632 is moved in the illustrated direction i along the opening slot 601*a*, the moving member 623 moves along the guide frame 624 to position the ball plunger 628 so that it is fitted into the groove portion 629 located in the right of the figure (see FIG. 13). On this occasion, the side surface of the moving member 623 also abuts against the regulating pin 630. The regulating pin 630 thus prevents the moving member 623 from slipping off from the guide frame 624. Further, the opening slot 601*a* is covered with the baffle 633 to prevent the entry of external beams.

If the ball plunger 628 is thus fitted into the groove portion 629 located in the right of FIG. 13, that is, the mirror 617 is at the position c in FIG. 6, the beams L are displaced parallel to the central axis of the image forming lens 616, that is, the optical axis Lb, before incidence. Thus, the projecting optical axis switches to Lc and the projection angle on the sample 3 switches to θc to the image pick-up optical axis of the stereomicroscope 7, that is, the left optical path LL.

The projection angle on the sample can be selectively varied between θa and θc by thus operating the operation volume 632 of the operation section 619 to switch the position of the mirror 617 in the projection angle switching section 615. In this case, even with a variation in projection angle between θa and θc, optical action prevents the position at which a lattice pattern image 20 is formed from being shifted on the optical axis Lb of the image forming lens 616.

In the above description, the operation volume 632 of the operation section 619 is manually controlled to operate the projection angle switching section 615. However, the operation volume 632 may be electrically operated. Further, the moving member 623 and guide section 618, used to move the mirror 617, are not limited to the above configurations or mechanisms. Moreover, the arrangement of the illuminating optical system composed of the illuminating optical system 608 and the projecting optical system 611 is not limited to the one described above.

Therefore, with the above configuration, the operation section 619 of the projection angle switching section 615 is operated to enable the lattice pattern projecting device 6 to selectively switch the projection angle. It is thus possible to reduce the magnitude of a shadow that may occur in the sample 3, without the need to provide a plurality of projection devices. Further, if the sample is not geometrically affected, a large projection angle to the image pick-up optical axis can be set. This enables accurate measurements. Moreover, the lattice pattern projecting device 6 switches the projection angle in the following manner: the projection angle switching section 615 is operated to move the mirror 617, placed in the afocal optical system having the objective lens 612. This makes it possible to prevent the position of the lattice pattern image 20 from being shifted on the optical axis of the condensing optical system including the image forming lens 616, in spite of a variation in projection angle. Furthermore, such an operation can be performed using the arrangement that moves the mirror 617, placed in the afocal optical system. Accordingly, the required mechanism is simple and inexpensive. Moreover, the projection angle set by the lattice pattern projecting device 6 can be varied within the range of effective diameter of the image forming lens 616. Consequently, the present invention can significantly vary the angle using the simple configuration compared to the invention disclosed in Jpn. Pat. Appln. KOKAI Publication No. 2004-191240, in which a plurality of projecting optical units are provided and independently operated to vary the projection angle. Moreover, the projection angle switching section 615 is characterized by its operability because it enables the projection angle to be easily switched by operating the operation volume 632 of the operation section 619. Additionally, the lattice pattern projecting device 6 can be configured to be compact and as a single unit. Thus, the lattice pattern projecting device 6 helps constitute an excellent system. For example, the lattice pattern projecting device 6 can be easily installed not only on the stereomicroscope 7 but also on a microscope consisting of a single observing optical axis or a video microscope.

Now, with reference to the drawings, description will be given of a third embodiment in accordance with the present invention.

The same members as those in the first and second embodiments have the same reference numerals and their detailed description is omitted.

Figure 15:
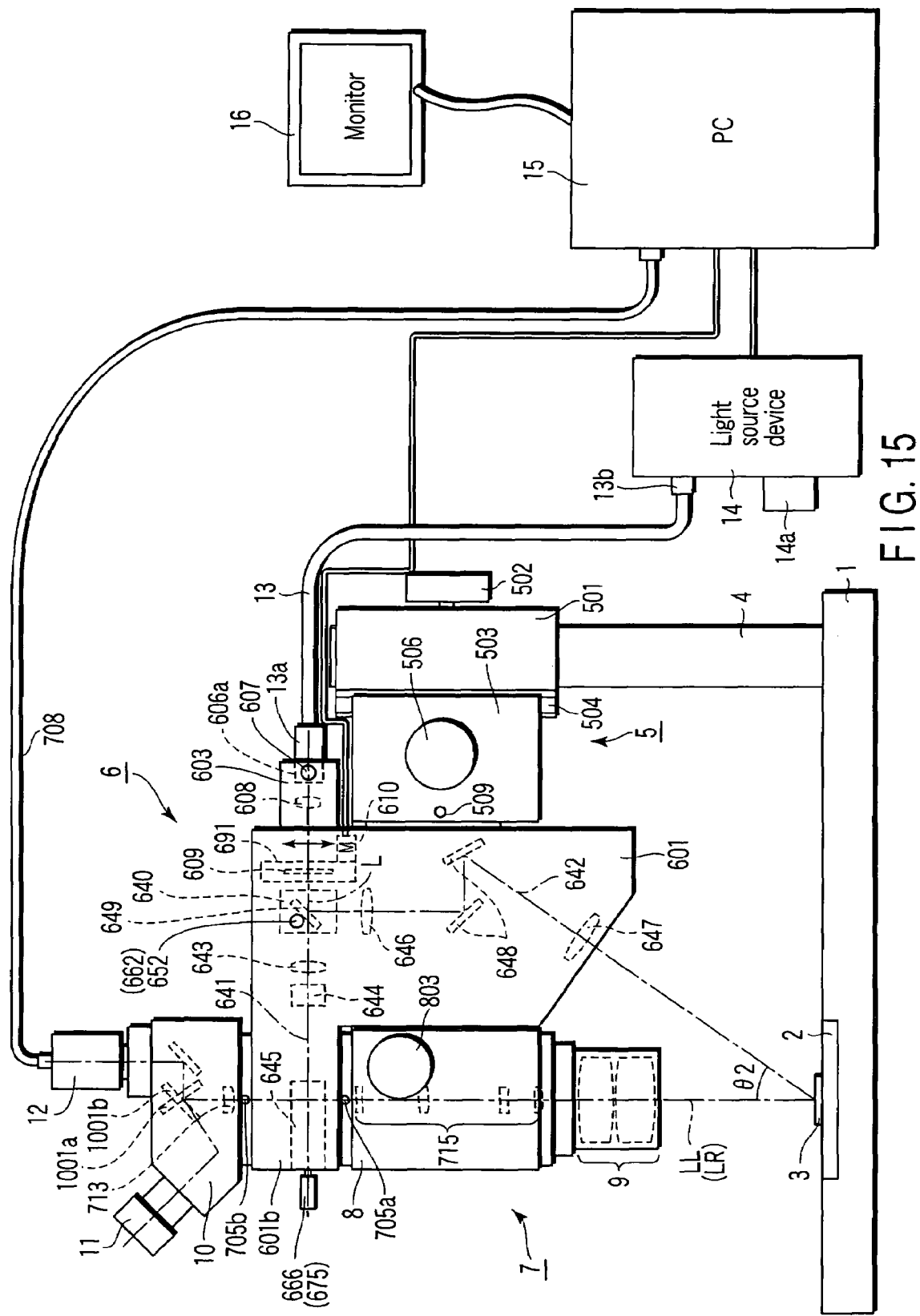
FIG. 15 is a side view showing a schematic configuration of a three-dimensional measuring apparatus in accordance with a third embodiment of the present invention.
Figure 16:
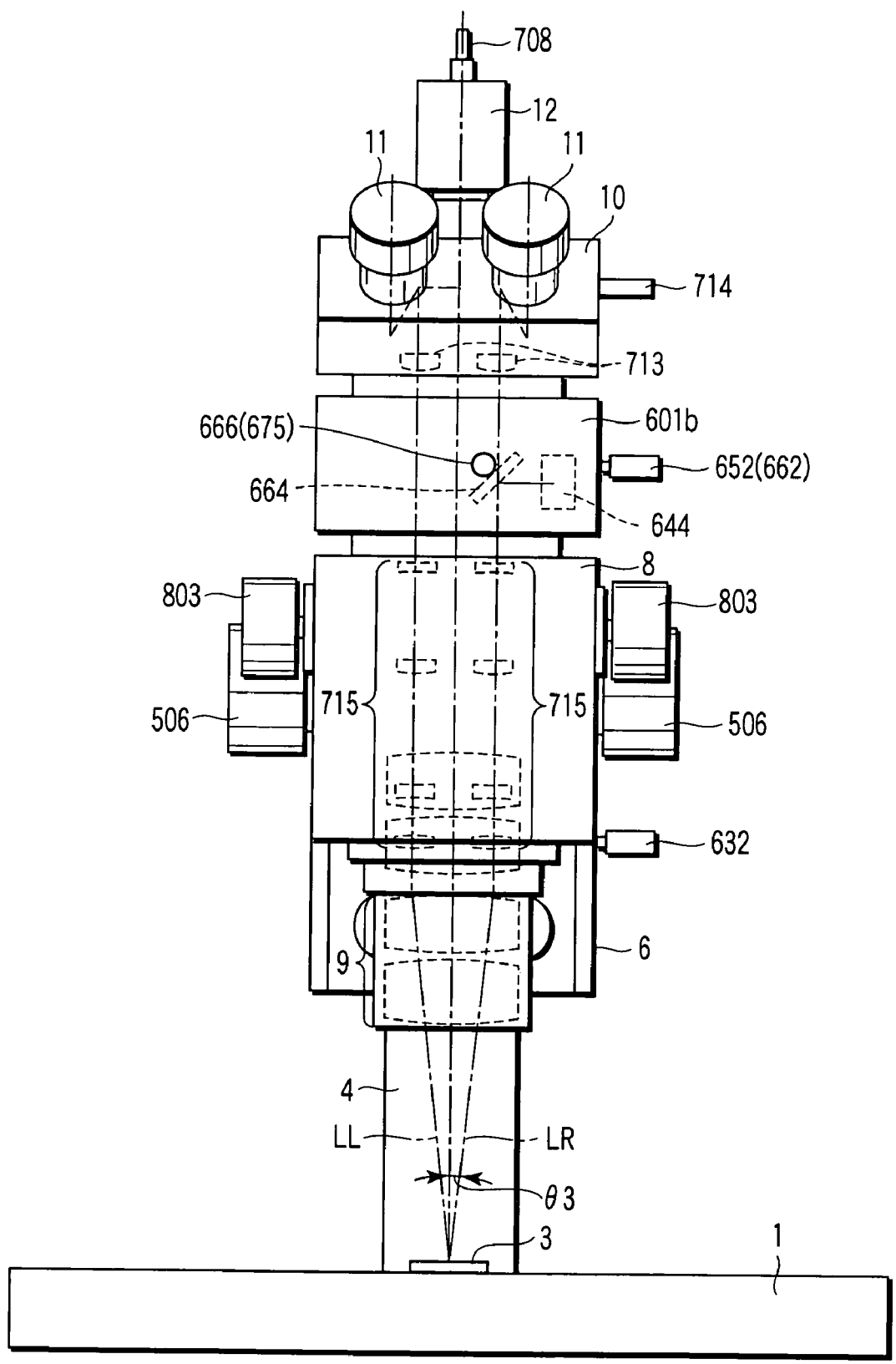
FIG. 16 is a front view showing a schematic configuration of the three-dimensional measuring apparatus in accordance with the third embodiment of the present invention.
Figure 17:
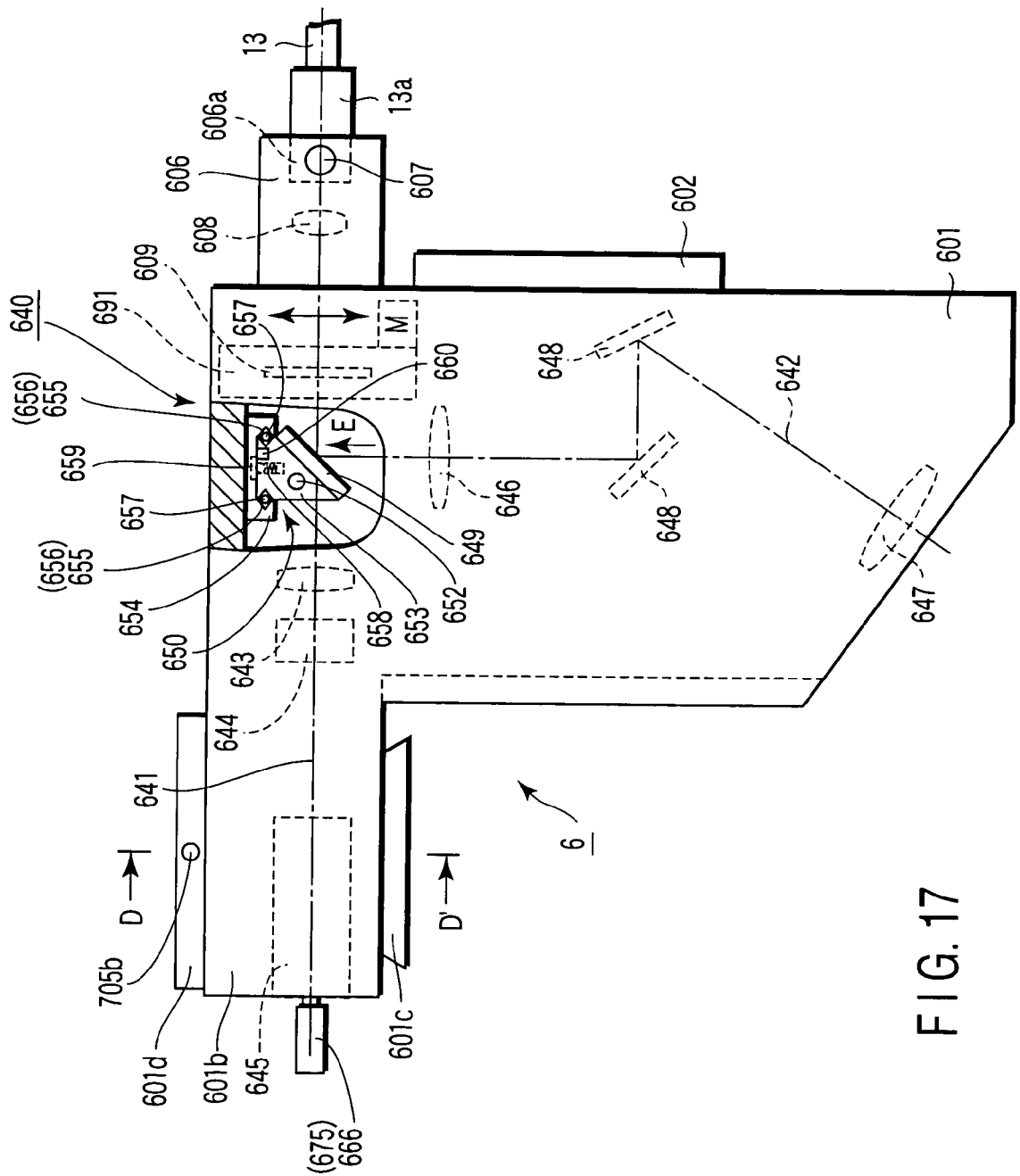
FIG. 17 is a partly sectional view of the lattice pattern projecting apparatus.
Figure 18:
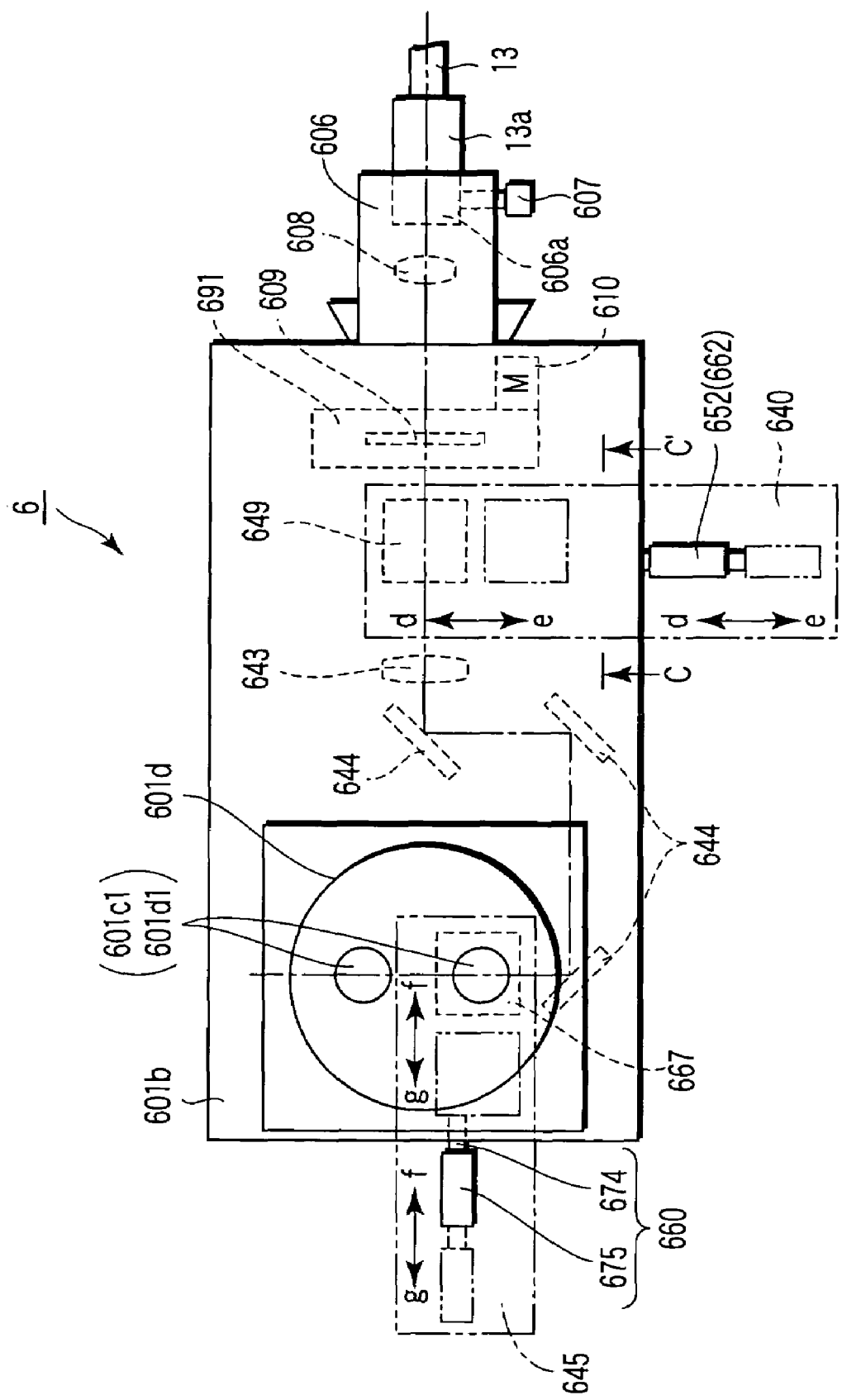
FIG. 18 is a top view of the lattice pattern projecting apparatus.
Figure 19:
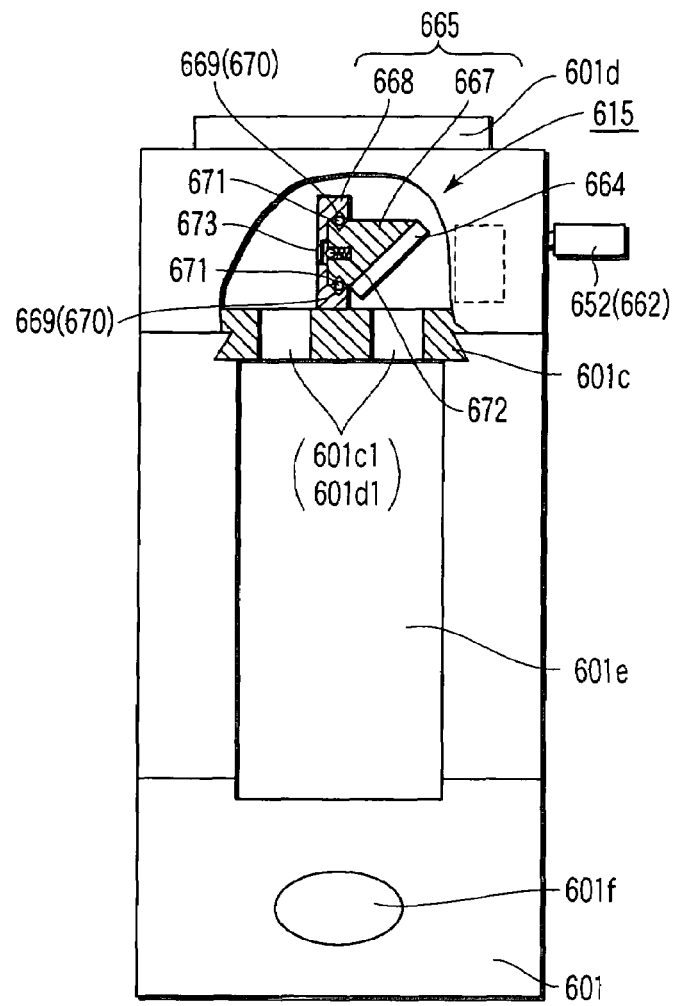
FIG. 19 is a front sectional view of the lattice pattern projecting apparatus.
Figure 20:
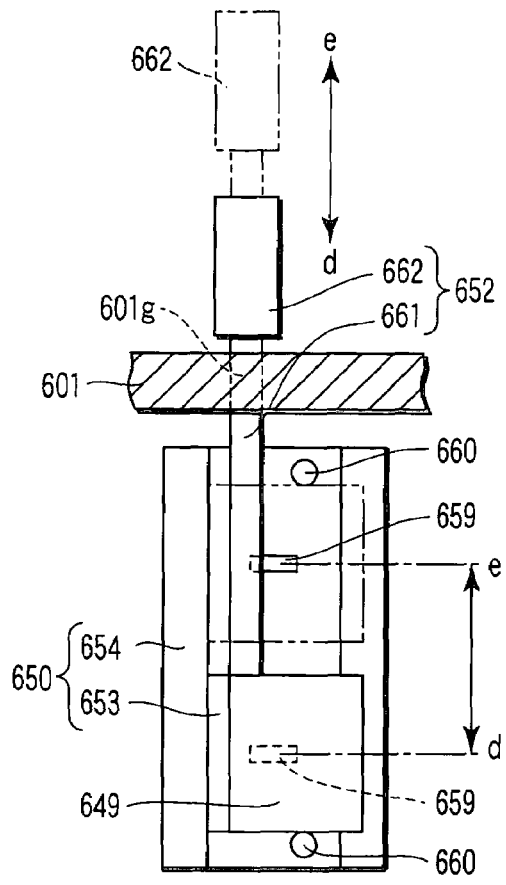
FIG. 20 is a diagram showing a part shown by arrow E in FIG. 17.

FIGS. 15 to 20 show a three-dimensional measuring apparatus employing the lattice pattern projection method according to the third embodiment of the present invention. FIG. 15 is a side view of a schematic configuration of a three-dimensional measuring apparatus in accordance with the third embodiment of the present invention. FIG. 16 is a front view of the schematic configuration of the three-dimensional measuring apparatus in accordance with the third embodiment of the present invention. FIG. 17 is a partly sectional right side view of the lattice pattern projecting apparatus (the sectional portion is taken along line CC' shown in FIG. 18). FIG. 18 is a top view of the lattice pattern projecting apparatus. FIG. 19 is a partly sectional front view of the lattice pattern projecting apparatus (the sectional portion is taken along line DD' shown in FIG. 17). FIG. 20 is a diagram showing a part shown by arrow E in FIG. 17.

In this case, the configuration except for the lattice pattern projecting device 6 is similar to that of the second embodiment. Further, for the lattice pattern projecting device 6, the optical fiber insertion portion 606, the optical modulation section 692, and the illuminating optical system 608 are configured similarly to those in the second embodiment. The same parts of these components as those in the second embodiment have the same reference numerals and their description is omitted.

The lattice pattern projecting device 6 has a bulging portion 601b formed at the top of the lattice pattern projecting device main body 601 and extending in the horizontal direction. The bulging portion 601b is provided between the stereomicroscope body 8 in the stereomicroscope 7 and the lens barrel 10. In this case, as shown in FIG. 17, a round male dovetail 601c is provided on a bottom surface of the bulging portion 601b of the lattice pattern projecting device main body 601. The stereomicroscope body 8 is detachably assembled on the round male dovetail 601c and fixed using a screw 705a. Further, a round female dovetail 601d is formed in a top surface of the bulging portion 601b. The lens barrel 10 is detachably assembled in the round female dovetail 601d and fixed using a screw 705b. Opening holes 601c1 and 601d1 are formed in the round male dovetail 601c and the round female dovetail 601d, respectively; the two optical paths LL and LR pass through the opening holes 601c1 and 601d1 (see FIGS. 18 and 19). Further, a concave portion 601e is formed in the lattice pattern projecting device main body 601 to avoid interfering with a sliding male dovetail (not shown) provided on the rear surface of the stereomicroscope body 8 in the stereomicroscope 7 as shown in FIG. 19. Moreover, an opening hole 601f is formed in the lattice pattern projecting device main body 601 to allow the beams L from a second projecting optical system 642 described below to pass through. Additionally, as shown in FIG. 17, the sliding male dovetail 602 is provided on the rear surface of the lattice pattern projecting device main body 601. The sliding male dovetail 602 is detachably assembled in a female dovetail (not shown) in the focusing device 5.

The optical fiber insertion portion 606 is provided on the lattice pattern projecting device main body 601 along the horizontal direction. In the lattice pattern projecting device main body 601, the optical modulation element 691, having the lattice pattern 609, and a projecting optical system switching section 640 are provided along an optical path for beams introduced from the exit end 13a of the optical fiber 13 via the optical fiber insertion portion 606. The projecting optical system switching section 640 switches the optical path for the beams L having passed through the optical modulation element 691, to either a first projecting optical system 641 side or a second projecting optical system 642 side. The first projecting optical system 641 projects a lattice pattern image on the sample 3 through the left optical path LR in the stereomicroscope 7. The first projecting optical system 641 is provided with an objective lens 643 serving as an afocal optical element to make beams incident via the projecting optical system switching section 640 afocal, an optical member 644 that changes the direction in which the beams transmitted through the objective lens 643 travel, and a projecting optical path switching section 645 that switches the optical path so that the afocal beams transmitted through the optical member 644 are guided to the right optical path LR in the stereomicroscope 7. The second projecting optical system 642 projects a lattice pattern image from the exterior of the stereomicroscope 7 on the sample 3 so that the lattice pattern image is inclined at a predetermined angle. The second projecting optical system 642 is provided with condensing optical systems 646 and 647 and a reflection mirror 648 that changes the direction in which the beams transmitted through the condensing optical system 646 travel. The lattice pattern image is projected on the sample 3 at an angle θ2 to the left optical path LL, which is the image pick-up optical axis of the stereomicroscope 7.

As shown in FIGS. 17 and 18, the projecting optical system switching section 640 is provided with a mirror 649, a guide section 650 that holds the mirror 649 so that it is linearly movable, and an operation section 652 that performs an operation of switching the projecting optical system. The guide section 650 is provided with a moving member 653 that holds the mirror 649 so that it is linearly movable and a guide frame 654 that linearly moves the moving member 653. The moving member 653 holds the mirror 649 at an angle such that the beams L transmitted through the optical modulation element 691 are redirected toward the second projecting optical system 642. The guide frame 654 is fixed to the lattice pattern projecting device main body 601.

Guide grooves 655 are formed in side walls of the guide frame 654. Guide grooves 656 are formed at the opposite ends of the moving member 653 in association with the guide grooves 655. Balls 657 are interposed between the guide grooves 655 and 656. The balls 657 enable the moving member 653 to linearly move smoothly (in directions d and e shown in FIG. 18). A ball plunger 658 is embedded in the moving member 653. A groove portion 659 is formed in the guide frame 654 in association with the ball plunger 658. This enables the moving member 653 to be positioned with the ball plunger 658 embedded in the groove portion 659. In this case, the groove portion 659 is formed at a plurality of (in the illustrated example, two) positions along the moving direction of the moving member 653 as shown in FIG. 20. A regulating pin 660 prevents the moving member 653 from slipping off from the guide frame 654.

A connection bar 661 is provided on the operation section 652 and has the moving member 653 fixed to its end as shown in FIG. 20. The connection bar 661 is projected through an opening hole 601g formed in the lattice pattern projecting device main body 601, to the exterior of the lattice pattern projecting device main body 601. An operation volume 662 is provided at an end of the connection bar 661. The operation volume 662 allows the user to move the moving member 653 from outside the lattice pattern projecting device main body 601.

Thus, the user pushes in the operation volume 662 in the direction d as shown in FIG. 20. This causes the ball plunger 658 to be fitted into the groove portion 659 at the illustrated position d to insert the mirror 649 into the optical path. The mirror 649 redirects the beams L having passed through the optical modulation element 691, toward the second projecting optical system 642.

Further, the user pulls out the operation volume 662 in the direction e. This causes the ball plunger 658 to be fitted into the groove portion 659 at the illustrated position 659 to move the mirror 649 off from the optical path. The beams L transmitted through the optical modulation element 691 are redirected toward the first projecting optical system 641.

On the other hand, the projecting optical light switching section 645 is provided in the bulging portion 601b of the lattice pattern projecting device main body 601. As shown in FIG. 19, the projecting optical path switching section 645 is provided with a mirror 664 serving as a deflecting portion, a guide section 665 that holds the mirror 664 so that it is linearly movable, and an operation section 666 that performs an operation of switching the projecting optical system. The mirror 664 is adapted to deflect afocal beams transmitted through the optical member 644, toward the right optical path LR in the stereomicroscope 7. The guide section 665 is provided with a moving member 667 that holds the mirror 664 so that it is linearly movable and a guide frame 668 that linearly moves the moving member 667. The moving member 667 holds the mirror 664 at an angle such that the beams L transmitted through the first projecting optical system 641 are redirected toward the right optical path LR in the stereomicroscope 7. The guide frame 668 is fixed to the lattice pattern projecting device main body 601. Guide grooves 669 and 670 are formed in side walls of the guide frame 668 and at the opposite ends of the moving member 667. Balls 671 are interposed between the guide grooves 669 and 670. The balls 671 enable the moving member 667 to linearly move smoothly. A ball plunger 672 is embedded in the moving member 667. A groove portion 673 is formed in the guide frame 668 in association with the ball plunger 672. This enables the moving member 667 to be positioned with the ball plunger 672 embedded in the groove portion 673. In this case, the groove portion 673 is formed at a plurality of, for example, two positions along the moving direction of the moving member 667 as in the case of FIG. 20, previously described. A regulating pin (not shown) is provided which prevents the moving member 667 from slipping off from the guide frame 668. A connection bar 674 is provided on the operation section 666 and has the moving member 667 fixed to its end as shown in FIG. 18. The connection bar 674 is projected through the lattice pattern projecting device main body 601 to the exterior of the lattice pattern projecting device main body 601. An operation volume 675 is provided at an end of the connection bar 674. The operation volume 675 allows the user to move the moving member 667 from outside the lattice pattern projecting device main body 601.

Thus, the user pushes in the operation volume 675 in the direction f as shown in FIG. 18. This causes the ball plunger 672 to be fitted into the groove portion 673 at the illustrated position f to insert the mirror 664 into the optical path in the first projecting optical system 641. The mirror 664 changes the direction of the afocal beams so that they are guided toward the right optical path LR in the stereomicroscope 7. Further, the user pulls out the operation volume 675 in the direction g to move the mirror 664 off from the optical path, with the ball plunger 672 fitted into the groove portion 659 at the illustrated position g.

Now, description will be given of the three-dimensional measuring apparatus configured as described above.

Also in this case, the focusing handle 506 of the focusing device 5 shown in FIG. 15 is first operated to move the moving member 503 up and down along the guide section 504. The sample 3 is thus made in focus. The user operates the light quantity adjustment volume 14a of the light source device 14 to adjust the quantity of light to an optimum value.

In this state, beams emitted by the light source device 14 are guided to the exit end 13a of the optical fiber 13. The beams are further guided from the exit end 13a to the optical fiber insertion portion 606. The guided beams are incident on the optical modulation section 692 through the illuminating optical system 608 in the illuminating optical system. The lattice pattern 609 in the optical modulation element 691 is thus irradiated with the beams. The beams L having passed through the lattice pattern 609 are incident on the projecting optical system switching section 640.

In this state, the user pushes in the operation volume 662 in the direction d as shown in FIG. 20. Then, the moving member 653 (mirror 649) moves along the guide frame 654. Further, the moving member 653 (mirror 649) is positioned with the ball plunger 658 fitted into the groove portion 659 at the illustrated position d. At this time, the moving member 653 (mirror 649) is precluded from passing over the groove portion 659, by the contact between the regulating pin 660 and the side surface of the moving member 653. When the user pulls out the operation volume 662 in the direction e, the moving member 653 (mirror 664) moves along the guide frame 654. The moving member 653 (mirror 649) is positioned with the ball plunger 658 fitted into the groove portion 659 at the illustrated position e. Also at this time, the moving member 653 (mirror 649) is precluded from passing over the groove portion 659, by the contact between the regulating pin 660 and the side surface of the moving member 653.

When the operation volume 662 of the projecting optical system switching section 640 is pulled out in the direction e to move the mirror 649 to the point e, the beams L transmitted through the lattice pattern 609 are incident on the first projecting optical system 641. The beams are then made afocal by the objective lens 643. The beams L have their advancing direction changed by the optical member 644 and then impinge on the projecting optical path switching section 645. The projecting optical path switching section 645 acts similarly to the projecting optical path switching section 640. As shown in FIG. 18, when the operation volume 675 is pushed in the direction f, the mirror 664 is inserted into the optical path in the first projecting optical system 641. This switches the mirror 664 so that the afocal beams are guided to the right optical path LR in the stereomicroscope 7 (illustrated position f). When the operation volume 675 is pulled out in the direction g, the mirror 664 is moved off from the optical path in the first projecting optical system 641. The mirror 664 is also moved off from the right optical path LR in the stereomicroscope 7 (illustrated position g).

Thus, when the operation volume 675 of the projecting optical path switching section 645 is pushed in the direction f to move the mirror 664 to the position f, the afocal beams from the objective lens 643 are reflected by the mirror 664. The beams are then incident on the right optical path LR in the stereomicroscope 7. In this case, the beams reflected by the mirror 664 pass through the opening hole 601c1 in the round male dovetail 601c shown in FIG. 18 and 19. The beams then enter the right optical path LR. The beams having entered the right optical path LR pass through the stereomicroscope body 8 and the objective lens 9 and are condensed on the surface of the sample 3. The condensed beams are projected on the surface of the sample 3 so as to incline an angle θ3 to the image picking-up axis, that is, the left optical path LL. The beams are thus formed into a lattice pattern image 20 on the surface of the sample 3. In this case, when the zoom handle 803 of the stereomicroscope 7 is operated to increase the magnification, the stereomicroscope body 8 reduces the size of the lattice pattern image 20, which is then projected on the sample 3. When the operation volume 675 of the projecting optical path switching section 645 is pulled out in the direction g to move the mirror 664 to the position g, the mirror 664 is moved off from the optical path of the projecting optical path 641. This precludes the afocal beams L transmitted through the objective lens 643 from being reflected by the mirror 664. Consequently, the lattice pattern image 20 is not projected on the sample 3, which can thus be visually checked through the ocular lens 11.

On the other hand, as shown in FIG. 20, when the operation volume 662 of the projecting optical system switching section 640 is pushed in the direction d to move the mirror 649 to the position d on the optical path, the beams L transmitted through the optical modulation element 691 enter the second projecting optical system 642. The beams having entered the second projecting optical system 642 pass through the condensing optical system 646 and reflection mirror 648 and then enter the condensing optical system 647. The beams having entered the condensing optical system 647 are projected on the sample 3 so as to incline at the angle 02 to the right optical path LL, the image pick-up optical axis of the stereomicroscope 7; the beams are thus formed into a lattice pattern image.

Also in this case, for a conversion into height based on the phase shift method, the projecting optical axis A of the lattice pattern 609 is inclined at the angle θ to the image pick-up optical axis B (left optical path LL) of the stereomicroscope 7 so that the variable-density pattern varies in the direction of inclination of the projecting optical axis A as shown in FIG. 14.

As previously described in the second embodiment, the lattice pattern image 20 on the sample 3 passes through the objective lens 9 in the stereomicroscope 7 and then the left optical path LL. The lattice pattern image 20 is then condensed by the image forming lens 713. In this case, the switching volume 714 of the lens barrel 10 is operated to move the optical path switching mirrors 1001a and 1001b. This switches the optical path LL to the TV camera 12 side. The lattice pattern image 20 condensed by the image forming lens 713 is picked up by an image pickup element (not shown) in the TV camera 12. The image is then loaded into PC 15 through the cable 708 and then displayed on the monitor 16 as measurements.

In the present embodiment, the projecting optical system switching section 640 and projecting optical path switching section 645 are manually operated. However, these sections may be electrically operated. Further, the guide section 650 of the projecting optical system switching section 640 and the guide section 665 of the projecting optical path switching section 645 are not limited to the above configurations or mechanisms. Moreover, the arrangement of the illuminating optical system composed of the illuminating optical system 608 and the first and second projecting optical systems 641 and 642 is not limited to the one described above.

Accordingly, in the lattice pattern projecting device 6, the projecting optical system switching section 640 can selectively switch between the first projecting optical system 641 and the second projecting optical system 642 so that the first projecting optical system 641 can project a lattice pattern image on the sample 3 through the right optical path LR in the stereomicroscope 7. Consequently, the present measuring apparatus can inexpensively deal with two-way projection that is effective in reducing the shadow of the sample 3. Further, the first and second projecting optical systems 641 and 642 are switched. That is, the projecting optical system switching section 640 switches between projection of a lattice pattern image through the right optical path LR in the stereomicroscope 7 and projection of a lattice pattern image from the exterior of the stereomicroscope 7. The projecting optical path switching section 645 perform switching operations for the first projecting optical system 641 in connection with the right optical path LR in the stereomicroscope 7. These switching operations are performed using the arrangement that requires only the insertion and removal of the mirror. Consequently, the present measuring apparatus can be inexpensively constructed using the simple mechanism. Moreover, the present measuring apparatus can easily deal with measurement of shape of the sample 3 and three-dimensional visual checks on the basis of switching operations performed by the projecting optical path. With the measuring apparatus, the user needs only to operate the projecting optical light switching section 645, to switch between the optical path for determining the shape of the sample 3 and the optical path for stereoscopic observation. In other words, the apparatus can be operated in accordance with the application. For example, the apparatus may achieve only the stereoscopic observation of the sample if there is no need to determined the shape of the sample 3. Moreover, when the present measuring apparatus is combined with a magnification varying function or zoom function of the stereomicroscope 7, the following effect can be exerted: since with projection from the right optical path LR in the stereomicroscope 7, the projection magnification of the lattice pattern image varies depending on a observation magnification, a reduced lattice pattern image can be projected on the sample by increasing the observation magnification. When the reduced lattice pattern image can be projected, since the present measuring apparatus can reduce the pitch of the lattice pattern image, very small parts of the sample 3 can be accurately measured. That is, even if the lattice pattern 609 itself has an invariable pitch, since the reduced lattice pattern image can be projected on the sample 3 by switching to the projection from the right optical path LR in the stereomicroscope 7 to increase the observation magnification, the present measuring apparatus can accurately measure very small parts. Furthermore, the present measuring apparatus can quickly make accurate measurements under the reduced adverse effect of the shadow by using PC 15 to synthesize two images obtained by projection in two directions.

Now, with reference to the drawings, description will be given of a fourth embodiment in accordance with the present invention.

The same members as those in the first, second, and third embodiments have the same reference numerals and their detailed description is omitted.

Figure 21:
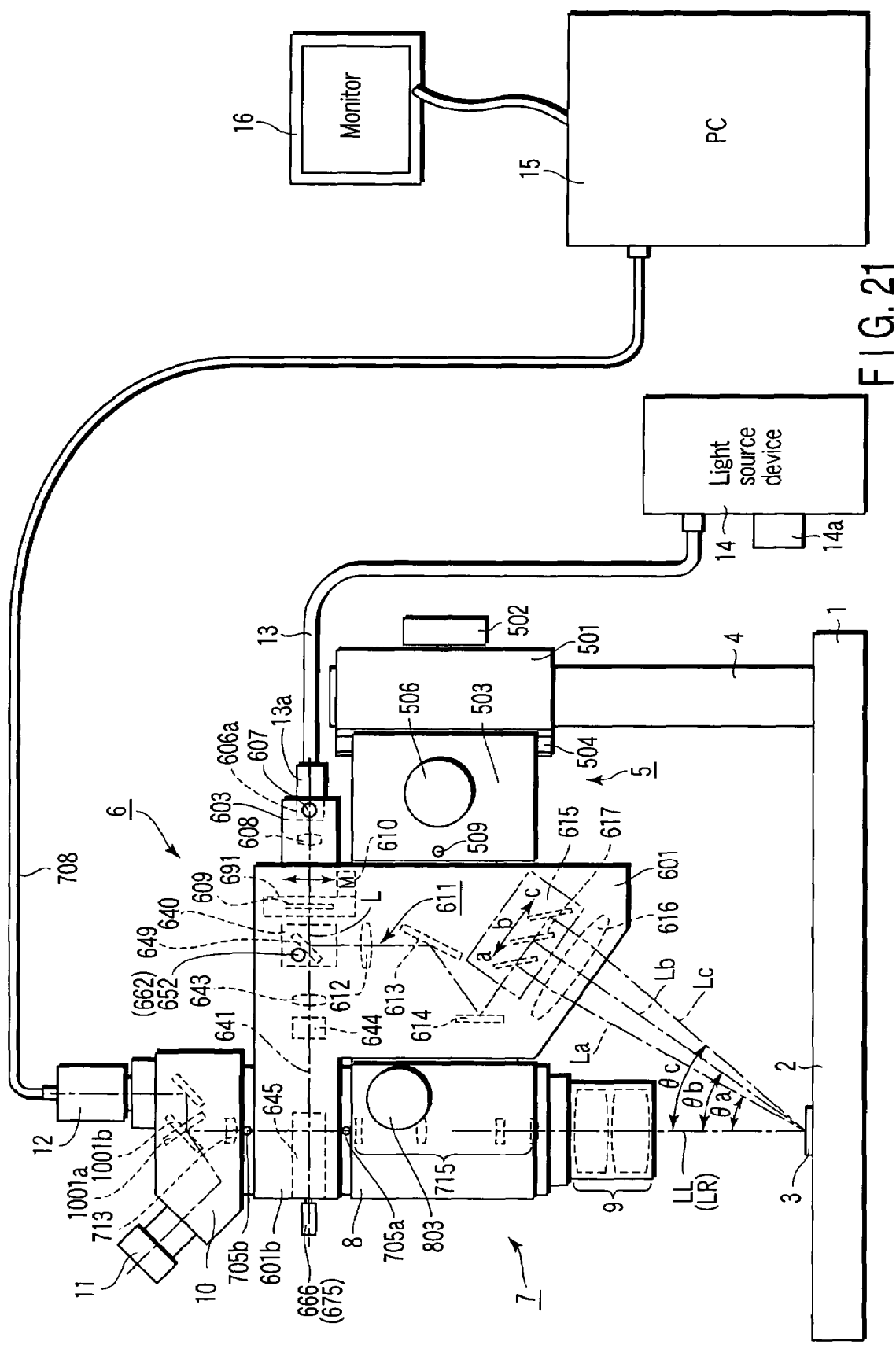
FIG. 21 is a side view showing a schematic configuration of a three-dimensional measuring apparatus in accordance with a fourth embodiment of the present invention.

FIG. 21 shows a side view of a three-dimensional measuring apparatus employing the lattice pattern projection method in accordance with a fourth embodiment of the present invention. The configuration of the fourth embodiment except for the lattice pattern projecting device 6 is similar to that of the third embodiment. The same parts as those in the third embodiment have the same reference numerals and their description is omitted.

In this case, the lattice pattern projecting device 6 has a configuration which is different from that of the third embodiment in the second projecting optical system 642 but which is similar to that of the second embodiment in the projecting optical system 611.

This configuration allows the first projecting optical system 641 to exert effects similar to those of the third embodiment and allows the projecting optical system 611 to exert effects similar to those of the second embodiment. Thus, the fourth embodiment as a whole exerts produces similar to those of the third embodiment and effects similar to those of the second embodiment.

The present invention is not limited to the above embodiments. In implementation, many variations may be made to the embodiments without departing from the spirit of the present invention. For example, in the present embodiment, the optical path is switched using the two mirrors, the optical path switching mirrors 1001a and 1001b. However, the optical path may be switched using only one mirror. Further, if the lattice pattern image projected on the sample 3 is not observed during visual checks, the following method may be used: the lattice pattern 609 is located off the optical path, the beams from the light source device 14 are blocked, or the light source is extinguished. Furthermore, in the present embodiment, the stereomicroscope 7 is used. However, the present invention is not limited to this. For example, a video microscope or a stereo microscope may be used.

Moreover, the above embodiments include inventions of various levels. Accordingly, various inventions can be extracted by appropriately combining a plurality of the constitution requirements disclosed. For example, even if any of the constitution requirements shown in the embodiments is deleted, a configuration free from the deleted constitution requirement can be extracted as an invention if the configuration can solve the above-described problems and exert the above-described effects.

Now, a fifth embodiment in accordance with the present invention will be described with reference to the drawings.

The same members as those in the first, second, third, and fourth embodiments have the same reference numerals and their detailed description is omitted.

Figure 22:
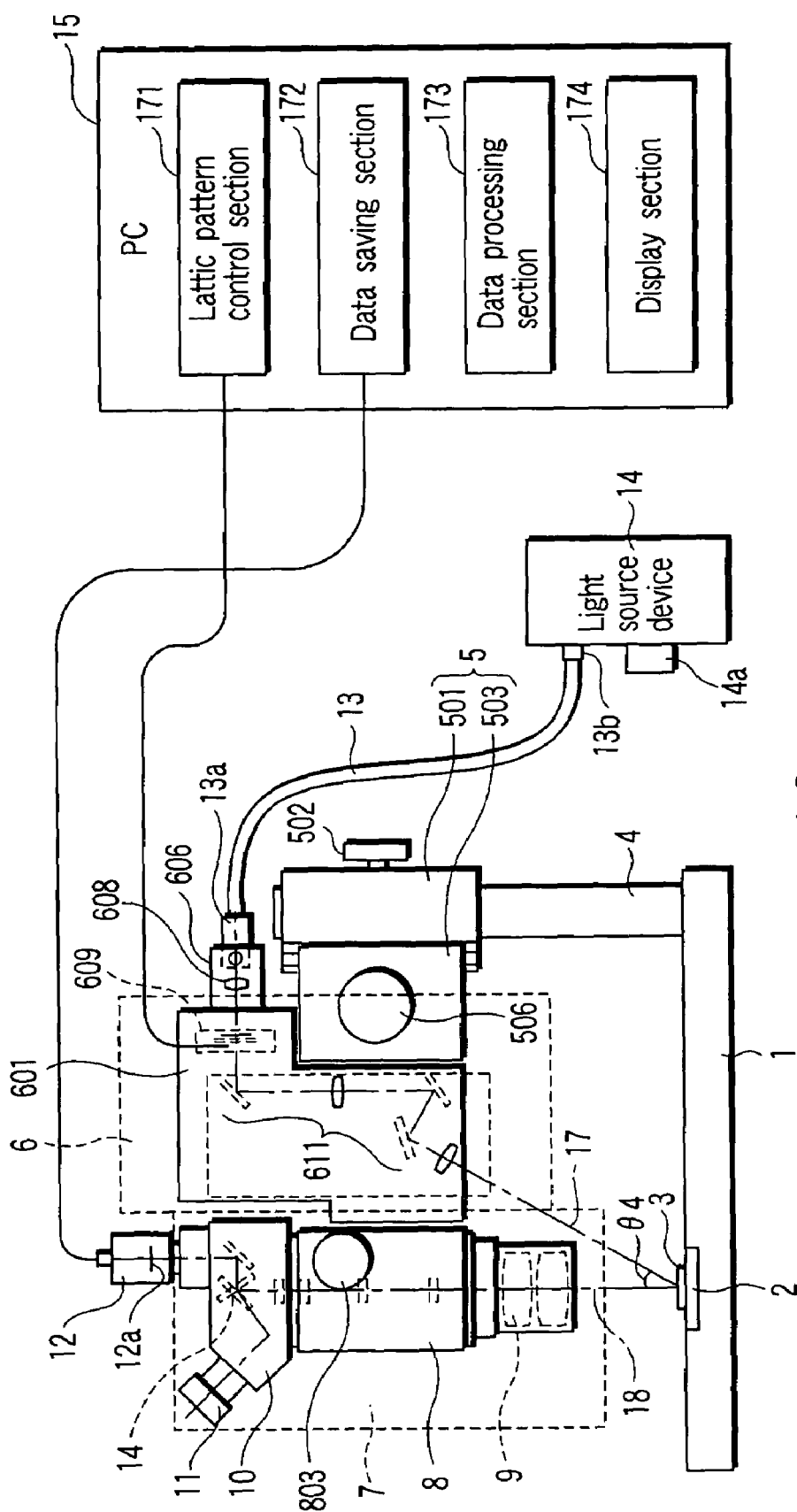
FIG. 22 is a diagram showing a schematic configuration of a three-dimensional measuring system to which a method for parameter setting in accordance with a fifth embodiment of the present invention is applied.

FIG. 22 is a diagram showing a schematic configuration of a three-dimensional measuring system to which a method for parameter setting in accordance with the fifth embodiment of the present invention is applied.

In FIG. 22, the stage 2 is provided on the base 1. The sample 3 is placed on the stage 2.

The pole 4 is uprightly provided on the base 1. The focusing device 5 is provided on the pole 4. The focusing device 5 is provided with the stereomicroscope 7 via the lattice pattern projecting device 6 that projects a lattice pattern.

The focusing device 5 has the focusing device main body 501 and the moving member 503. The pole 4 is inserted through the focusing device main body 501. The fixing handle 502 is provided on the focusing device main body 501. The fixing handle 502 is rotated in the direction in which it is tightened to enable the focusing device main body 501 to the pole 4. The moving member 503 is supported so that it can be moved with respect to the focusing device main body 501 by a guide section (not shown). Further, the elevating and lowering mechanism is provided between the focusing device main body 501 and the moving member 503; the elevating and lowering mechanism consists of a pinion and a rack (not shown). The focusing handle 506 is connected to the elevating and lowering mechanism. The focusing handle 506 is operated to enable the moving member 503 to move up and down along the pole 4.

The lattice pattern projecting device 6 is detachably provided on the moving member 503 via an installation member (not shown) such as a dovetail.

In the lattice pattern projecting device 6, the lattice pattern projecting device main body 601 is provided with the optical fiber insertion portion 606. The optical fiber insertion portion 606 has the exit end 13a of the optical fiber 13 provided at its tip portion and serving as a light guide. The illuminating optical system 608 is provided inside the optical fiber insertion portion 606 (on the optical path). The illuminating optical system 608 makes the beams from the exit end 13a of the optical fiber 13 almost parallel. The illuminating optical system 608 then guides the beams to the interior of the lattice pattern projecting device main body 601.

The lattice pattern 609 is provided inside the lattice pattern projecting device main body 601 (on the optical path). The lattice pattern 609 generates a lattice pattern displaying a brightness varying like a sine waveform, at pitches set at fixed intervals, in accordance with instructions from a lattice pattern control section 171 provided in the personal computer (referred to as PC below) 15, which is an image arithmetic processing apparatus described below. The lattice pattern 609 can shift the lattice pattern over several levels across the pitch.

The projecting optical system 611 is placed in the optical path having passed through the lattice pattern 609. The projecting optical system 611 projects a lattice pattern image on the sample 3 via the projecting optical path 17 so that the image is inclined at a predetermined angle, that is, a predetermined incident angle $\theta 4$, to the sample 3; the lattice pattern image is formed by the lattice pattern 609 and has bright and dark areas.

In this case, the projecting optical system 611 constitutes a two-sided telecentric optical system for the object (lattice pattern 609) and image (sample 3). The two-sided telecentric optical system is used because the size (magnification) of a lattice pattern image before the focal surface is the same as that after the focal surface; the size can be fixed. This prevents measurement errors resulting from a variation in the size of the lattice pattern image.

The stereomicroscope 7 is detachably provided on the lattice pattern projecting device 6 via an installation member (not shown) such as a dovetail. The stereomicroscope 7 is provided with the stereomicroscope body 8. The stereomicroscope body 8 is provided with the zoom handle 803. The zoom handle 803 is operated to enable the magnification of the stereomicroscope body 8 to be varied.

The objective lens 9 is installed at the lower end of the stereomicroscope body 8. In this case, the objective lens 9 uses a screwing method in which the objective lens is screwed around the zoom mirror for installation. The objective lens 9 is placed above the sample 3. The sample 3 can be made in focus by operating the focusing device 5 to move the stereomicroscope body 8 up and down to vary the relative distance to the sample 3.

The lens barrel 10 is installed at the upper end of the stereomicroscope body 8. The lens barrel 10 consists of three lenses. The lens barrel 10 is provided with the ocular lens 11 serving as an observation section and the TV camera 12 serving as an image pickup section. The optical path switching section 1001 is provided inside the lens barrel 10. The optical path switching section 1001 is placed on the image pick-up optical path 18, through which beams reflected by the sample 3 are guided via the objective lens 9. By using the optical path switching mirror 1001a to carry out switching to one of the optical paths, it is possible to allow the ocular lens 11 to form the beams reflected by the sample 3 into a deformed lattice pattern image; the image can then be visually checked. On the other hand, by using the optical path switching mirror 101b to carry out switching to the other optical path, it is possible to form the beams into a deformed lattice pattern image on the image pickup surface 12a of the TV camera 12.

On the other hand, the light source device 14 is connected to the entrance end 13b of the optical fiber 13. The light source device 14 uses for example, a halogen lamp or a xenon lamp as a light source. Further, the light source device is provided with the light quantity adjustment volume 14a, which adjusts the quantity of light in the beams emitted by the light source.

PC 15 is connected to the TV camera 12 to process images. PC 15 has a lattice pattern control section 171 which instructs the lattice pattern 609 to generate a lattice pattern having a brightness varying like a sine waveform and which controls the shift of the lattice pattern, a data saving section 172 that saves images picked up by the TV camera 12, and a data processing section 173 that arithmetically calculates the picked-up images to determine the three-dimensional surface shape of the sample 3. Further, PC 15 is provided with the display section 174.

Figure 23:
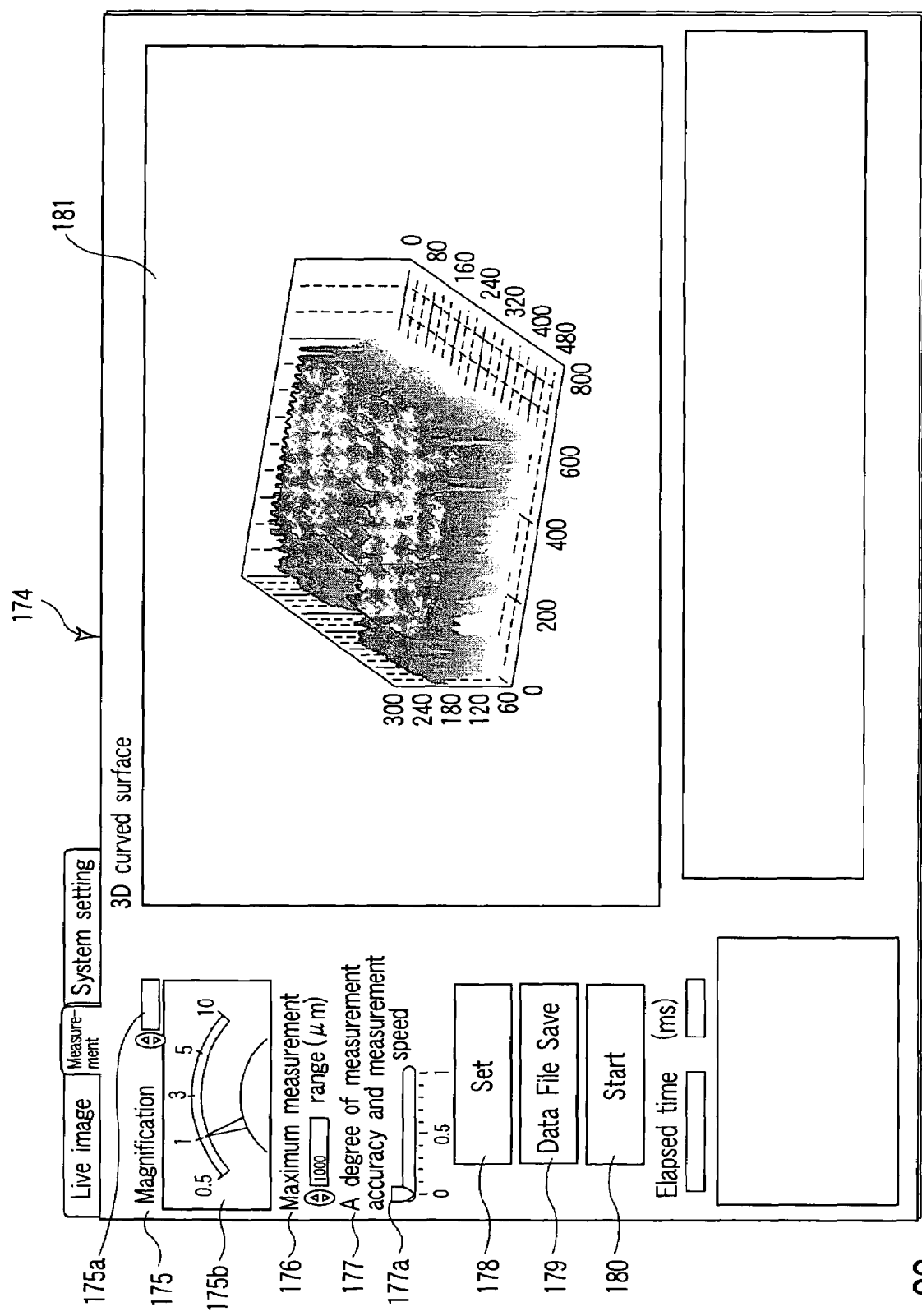
FIG. 23 is a diagram showing an example of a display screen of a display section.

FIG. 23 shows an example of the display screen of the display section 174.

In this case, the following are arranged to the left of the display screen as parameter input means for inputting parameters: a magnification input section 175 that inputs the magnification of the observation system, a maximum measurement range input section 176 that inputs the maximum measurement range (the maximum height of main body of the sample 3) of the sample 3, an object to be measured, and a ratio input section 177 that inputs a degree of measurement accuracy and measurement speed. The magnification input section 175 has a numerical value input section 175a that numerically inputs the magnification of the observation system and a magnification input section 175b that inputs an indicator in accordance with the value of a desired magnification. The maximum measurement range input section 176 numerically inputs the maximum measurement range for the sample 3 to be actually measured. The ratio input section 177 inputs a degree of measurement accuracy and measurement speed by moving the indicator 177a between 0 and 1. For example, setting the indicator 177a at 0.5 sets a degree of measurement accuracy and measurement speed at 1:1. If measurement accuracy is to be given top priority, the indicator 177a is set between 0 and 0.5. If measurement speed is to be given top priority, the indicator 177a is set between 0.5 and 1.

A set switch 178, a save switch 179, and a start switch 180 are arranged below the magnification input section 175, maximum measurement range input section 176, and ratio input section 177 as various operation switches.

Moreover, a main display screen 181 is placed in a central portion of display screen of the display section 174 to display a three-dimensional surface shape determined by the data processing section 173 by arithmetically processing picked-up images.

Now, description will be given of a method for displaying data ranging from parameter settings to measurements in the three-dimensional measuring system configured as described above.

Figure 24:
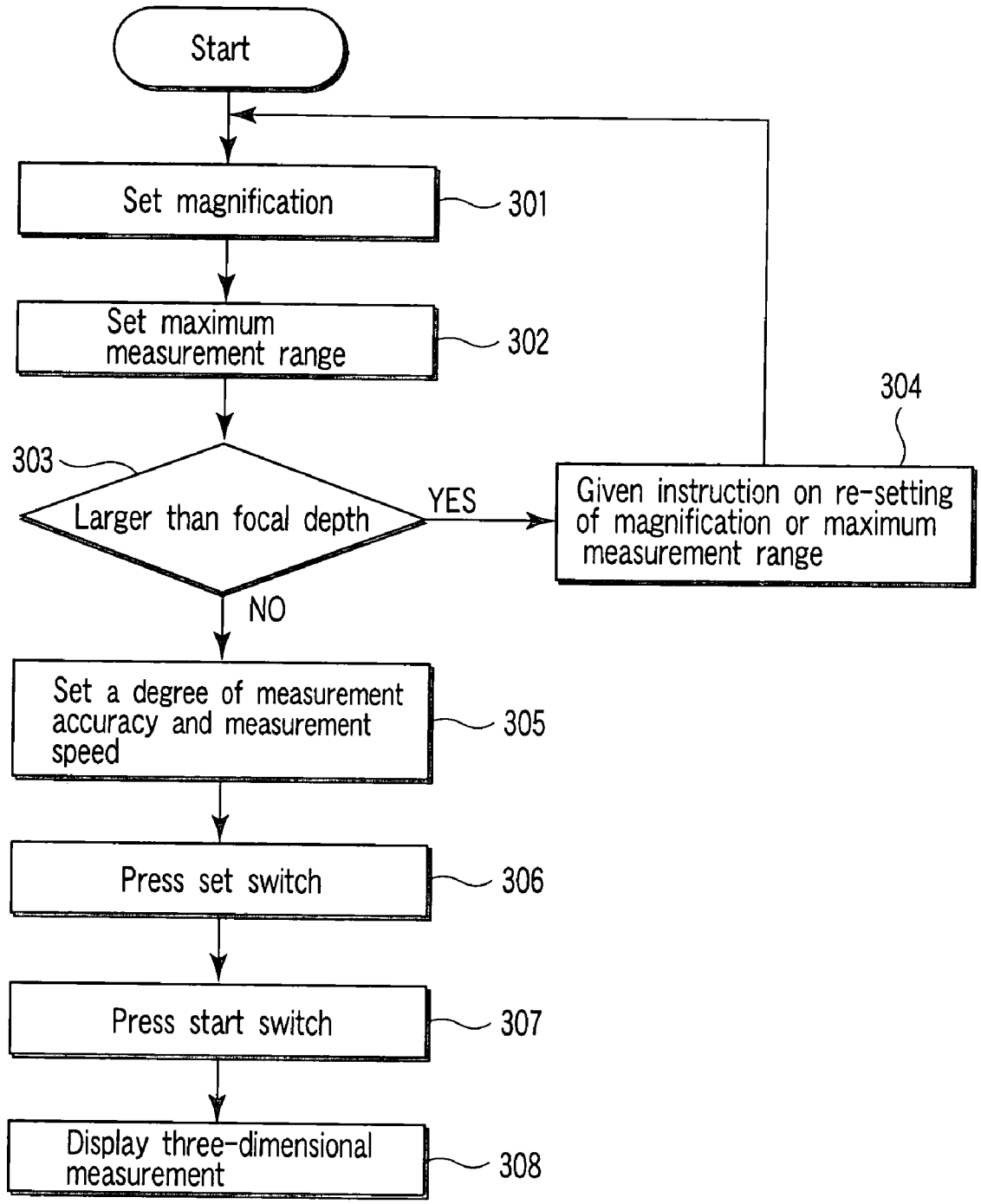
FIG. 24 is a flowchart illustrating a process from parameter setting to display of measurements in accordance with an embodiment.

In this case, the flowchart shown in FIG. 24 is executed.

First, in step 301, the user sets the magnification of the observation system. In this case, the user uses the magnification input section 175 on the display section 174, shown in FIG. 23, to input the magnification of the objective lens 9 inserted into the image pick-up optical path 18. The numerical value input section 175a or magnification input section 175b is used to input the magnification.

To electrically switch the magnification of the objective lens 9, the magnification may be automatically input on the basis of switching information from the revolver.

Then, in step 302, the user sets the maximum measurement range. In this case, the user uses the maximum measurement range input section 176 on the display section 174, shown in FIG. 23, to input the maximum measurement range determined from the actually measured sample 3.

Then, the process advances to step 303. A control section (not shown) provided in PC 15 determines whether or not the set maximum measurement range is larger than the focal depth corresponding to the magnification of the objective lens 9.

In this case, upon determining that the set maximum measurement range is larger than the focal depth corresponding to the magnification of the objective lens 9, the control section proceeds to step 304. The control section outputs an instruction on re-setting of the magnification or maximum measurement range in step 304. In this case, the user returns to step 301 to re-set the magnification or maximum measurement range.

On the other hand, in step 303, when the control section does not determine that the maximum measurement range is larger than the focal depth corresponding to the magnification, it proceeds to step 305. The control section sets a degree of measurement accuracy and measurement speed in step 305. In this case, the user sets a degree of measurement accuracy and measurement speed by moving the indicator 177a between 0 and 1 in the ratio input section 177 on the display section 174, shown in FIG. 23. Here, for a degree of measurement accuracy and measurement speed $\beta \in (0,1)$, the measurement accuracy increases but the measurement speed decreases with increasing value of $\beta$.

Then, in step 306, the user depresses the set switch 178 on the display section 174, shown in FIG. 23, for an operation.

In this case, the control section calculates the lattice pitch Pitch of the lattice pattern 609 from Equation (2), shown below.

$$\text{Pitch} = (\text{High}/\sin \alpha)(1-\beta) \quad (2)$$

In this equation, High is the maximum measurement range and $\alpha$ is the incident angle of an incident beam. Here, a designed value is used for $\alpha$.

Then, data on a lattice pattern from the lattice pattern 609 is generated on the basis of the lattice pitch Pitch of the lattice pattern 609 calculated from Equation (2). The data is saved to the data saving section 172 and then transferred to the lattice pattern control section 171. On the basis of this data, the lattice pattern control section 171 instructs the lattice pattern 609 to generate a lattice pattern having a brightness varying like a sine waveform.

On the other hand, the control section opens a reference phase data file (not shown) to read pre-provided reference phase data in accordance with the magnification, maximum measurement range, and a degree of measurement accuracy and measurement speed set as described above. The control section then saves the read data to the data saving section 172. The reference phase data file will be described below.

Then, in step 307, the user depresses the start switch 180 on the display section 174, shown in FIG. 23, to perform the operations described below.

In this case, in FIG. 22, the light source device 14 emits beams. The beams are guided to the lattice pattern projecting device 6 via the optical fiber 13. The guided beams are made almost parallel to one another via the illuminating optical system 608. The lattice pattern 609 is then uniformly irradiated with the almost parallel beams. The beams applied to and transmitted through the lattice pattern 609 then pass through the projecting optical system 611. The beams are then projected on the sample 3 through the projecting optical path 17 so as to incline at a predetermined angle, thus forming a lattice pattern image having bright and dark areas. The lattice pattern image projected on the sample 3 is reflected and scattered by the surface of the sample 3. Scattered beams are guided to the image pick-up optical path 18 via the objective lens 9. In this case, provided that switching to the other optical path has been set in the optical path switching section 14 on the image pick-up optical path 18, a deformed lattice pattern image based on the scattered beams is formed on and picked up by the image pickup surface 12a of the TV camera 12. Switching the optical path switching section 14 also enables the ocular lens 11 to form the guided scattered beams into a deformed lattice pattern image. The user can thus carry out visual checks through the ocular lens 11.

The user repeatedly observes such a deformed lattice pattern image a number of times while using the lattice pattern control section 171 to shift a lattice pattern from the lattice pattern 609 over several levels. The image (phase shift image) of each position picked up by the TV camera 12 is saved to the data saving section 172.

Then, the phase is calculated. Equation (3), shown below, is used to calculate the phase distribution.

$$\phi(x, y) = \tan^{-1}\left[\frac{-\sum I_i(x, y) \times \sin(\delta_i)}{\sum I_i(x, y) \times \cos(\delta_i)}\right] \quad (3)$$

In this equation, Ii(x,y) is the luminance value of each shift point (x,y), $\delta_i = (i/N)2\pi$ (i=0, ..., N-1) is a phase shift amount, and N is the number of shifts.

Then, the difference between the phase determined and the reference phase is determined; the reference phase has been saved to the data saving section 172. Equation (1), described above, is used to find the height Height.

In this case, measurements of larger heights can be reproduced by using a technique such as phase connection.

In step 308, the three-dimensional measurement determined by such a series of processes is displayed on the main display screen 181 of the display section 174 as a three-dimensional surface shape.

Now, a brief description will be given of creation of a reference phase data file.

Figure 25:
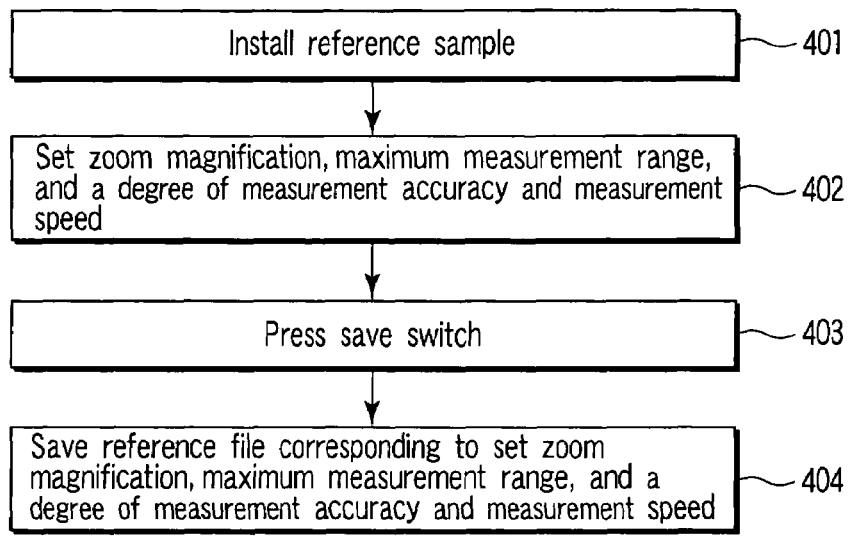
FIG. 25 is a flowchart illustrating how to create a reference phase data file in accordance with an embodiment.
Figure 26:
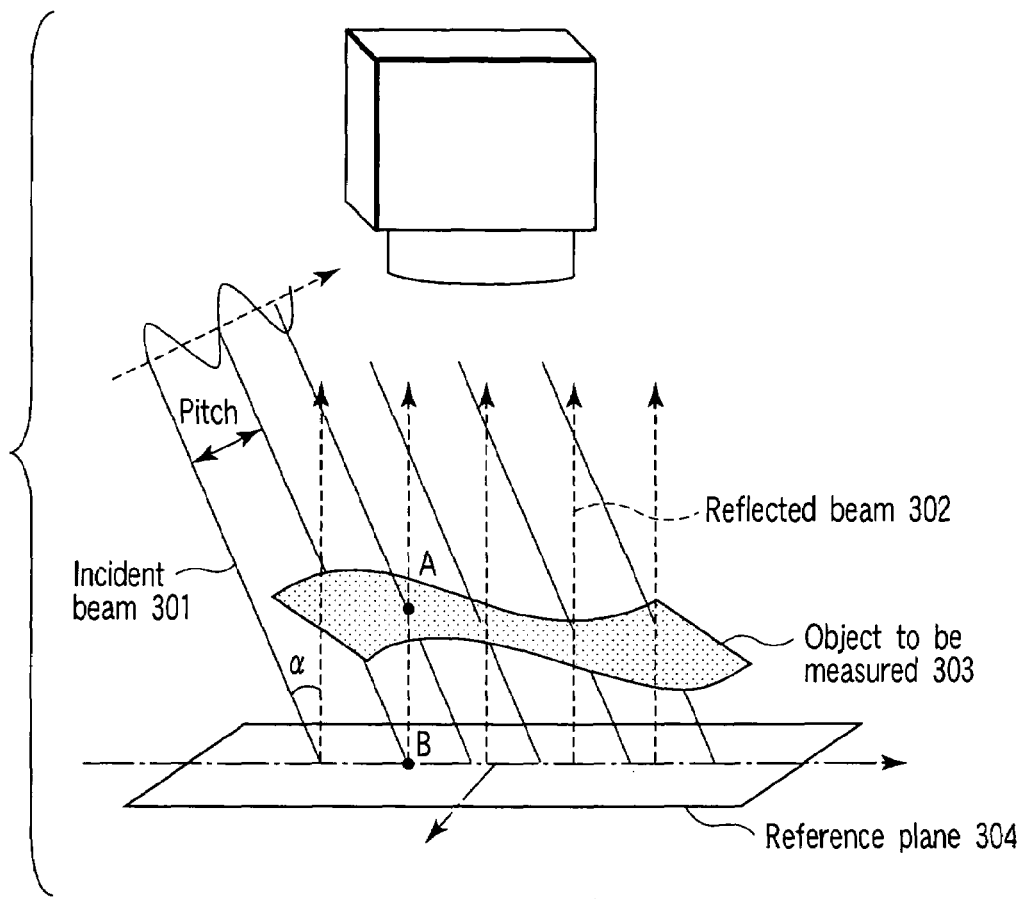
FIG. 26 is a diagram showing an example of a method using conventional triangulation.

In this case, the flowchart shown in FIG. 25 is executed.

A reference sample is used to create a reference phase data file. First, in step 401, instead of the sample 3, a reference sample is placed on the stage 2. A planar sample is used as the reference sample.

Then, in step 402, the following parameters are set: the magnification, the maximum measurement range, and a degree of measurement accuracy and measurement speed. The parameters are set in the same manner as that described for the flowchart in FIG. 24.

Then, in step 403, the user depresses the save switch 179 on the display section 174, shown in FIG. 23.

First, the control section calculates the lattice pitch Pitch of the lattice pattern 609 from Equation (2), described above. Then, data on a lattice pattern from the lattice pattern 609 is generated on the basis of the lattice pitch Pitch of the lattice pattern 609 calculated from Equation (2). The data is transferred to the lattice pattern control section 171. On the basis of the data, the lattice pattern control section 171 instructs the lattice pattern 609 to generate a lattice pattern having a brightness varying like a sine waveform.

In this state, beams generated by the light source device 14 are transmitted through the lattice pattern 609. The transmitted beams are projected on the reference sample as a lattice pattern image so as to incline at a predetermined angle. Of the beams reflected by the reference sample, scattered beams are picked up by the TV camera 12 to form a deformed lattice pattern image. The user repeatedly observes the picked-up deformed lattice pattern image a number of times while using the lattice pattern control section 171 to shift a lattice pattern from the lattice pattern 609 over several levels. The image (phase shift image) of each position picked up by the TV camera 12 is saved to the data saving section 172.

Then, the control section uses Equation (3), described above, to calculate the phase and further carries out phase connections. The result is saved to the reference phase data file as reference phase data.

Subsequently, the user repeats the above operations while arbitrarily varying the settings of the parameters for the zoom magnification, the maximum measurement range, and a degree of measurement accuracy and measurement speed. The user thus generates reference phase data corresponding to the parameters for the set zoom magnification, maximum measurement range, and a degree of measurement accuracy and measurement speed. The user then saves the reference phase data to the reference phase data file (step 404).

Thus, the user can acquire a three-dimensional image of the sample 3 simply by setting the parameters for the magnification of the observation system, the maximum measurement range of the object to be measured, and a degree of measurement accuracy and measurement speed. Therefore, the user can extremely easily set the parameters and has only to bear a sharply reduced burden.

When the user sets the parameters, if the control section determines that the maximum measurement range of the sample 3 is larger than the focal depth corresponding to the magnification, an instruction is given on re-setting of the maximum measurement range or magnification parameter. The control section can prevent disabled measurements resulting from the setting of an inappropriate parameter. The user can always carry out stable three-dimensional measurements.

Furthermore, the user sets a degree of measurement accuracy and measurement speed to enable the setting of a lattice pattern with the optimum lattice pitch corresponding to the ratio. Thus, the user can easily control the priority balance between measurement accuracy and measurement speed.

Moreover, the reference phase data file stores reference phase data predetermined using the reference sample. For measurement, the corresponding reference phase data is read from the reference phase data file for use. This eliminates the need to create reference phase data for each measurement. The user can carry out efficient three-dimensional measurements. Further, lattice pattern data on the lattice pattern 609 is saved to the data saving section 172. Consequently, consecutive measurements can be quickly carried out by using the lattice pattern data together with the reference phase data saved to the reference phase data file.

Such a lattice pattern 609 may be for example, liquid crystal lattice. In this case, the lattice is driven by a control driver (not shown).

Moreover, the adverse effect of distortion on the apparatus can be reduced by using a planar sample as a reference sample to create reference phase data.

The present invention is not limited to the above embodiments. In implementation, many variations may be made to the embodiments without departing from the spirit of the present invention. For example, for parameter setting, the above embodiments set the magnification of the observation system, the maximum measurement range of the object to be measured, and a degree of measurement accuracy and measurement speed. However, the effects of the present invention can be exerted by setting only the magnification of the observation system and the maximum measurement range of the object to be measured. In this case, the parameter setting of a degree of measurement accuracy and measurement speed can be omitted; the setting is otherwise executed in step 305 in the flowchart shown in FIG. 24 and in step 402 in the flowchart shown in FIG. 25.

The above embodiments include inventions of various levels. Accordingly, various inventions can be extracted by appropriately combining a plurality of the constitution requirements disclosed. For example, even if any of the constitution requirements shown in the embodiments is deleted, a configuration free from the deleted constitution requirement can be extracted as an invention if the configuration can solve the above-described problems and exert the above-described effects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional measuring apparatus comprising:
   a light source which emits an illumination beam;
   a lattice pattern which makes the illumination beam into a plurality of parallel slit beams to form a lattice pattern image;
   a projecting optical system which projects the lattice pattern image on a sample so that the image is inclined at a predetermined angle;
   a lattice pattern projecting section provided on an optical path for the illumination beam and having the lattice pattern and the projecting optical system;
   a microscope used to observe the sample and the lattice pattern image reflected by the sample;
   a focusing section which moves the microscope to adjust a focal position with respect to the sample;
   an image pick up section which picks up the lattice pattern image observed using the microscope;
   an image processing section which recesses the lattice pattern image picked up by the image pick up section to determine a three-dimensional surface shape of the sample; and
   two observing optical paths which are provided in the microscope and which are placed above the sample and which cross each other to form a predetermined inward angle to the sample;
   wherein the projecting optical system includes:
   a first projecting optical system which projects the lattice pattern image from above the sample on the microscope via one of the observing optical paths;
   a second projecting optical system which projects the lattice pattern image on the sample so that the lattice pattern image is inclined at the predetermined angle; and
   an optical path switching section which passes the beams transmitted through the lattice pattern, to either the first projecting optical system or the second projecting optical system.

2. The three-dimensional measuring apparatus according to claim 1, wherein the lattice pattern projecting section is connected to the light source via an optical fiber.

3. The three-dimensional measuring apparatus according to claim 1, wherein the microscope includes one of a stereomicroscope to visually check the sample and the lattice pattern image through the two observing optical paths, and a video microscope.

4. The three-dimensional measuring apparatus according to claim 1, wherein the lattice pattern is a liquid crystal lattice which enables a driver controlling a liquid crystal to moves the lattice pattern a distance equal to predetermined pitches.

5. The thee-dimensional measuring apparatus according to claim 1, wherein the projecting optical system comprises:
   an afocal optical system which makes the beams transmitted through the lattice pattern afocal;
   at least one optical member which varies a direction in which the afocal beams travel; and
   a condensing optical element which forms the afocal beams transmitted through the optical member into the lattice pattern image on a surface of the sample.

6. The three-dimensional measuring apparatus according to claim 1, further comprising a driving source to move the lattice pattern a distance corresponding to predetermined pitches, said driving source including a motor.

7. The three-dimensional measuring apparatus according to claim 1, wherein the lattice pattern projecting section has a first installation portion configured to be installed on and removed from the focusing section, and the microscope has a second installation portion configured to be installed on and removed from the lattice pattern projecting section, and the first and second installation portions are compatible.

8. The three-dimensional measuring apparatus according to claim 1, wherein the projecting optical system comprises:
   an afocal optical system which makes the beams transmitted through the lattice pattern afocal;
   at least one optical member which varies the direction in which the afocal beams travel;
   a condensing optical element which forms the afocal beams transmitted through the optical member into the lattice pattern image on the surface of the sample, and
   a projection angle varying section which varies the predetermined angle at which the lattice pattern image is projected on the surface of the sample.

9. The three-dimensional measuring apparatus according to claim 8, wherein the projection angle varying section comprises a moving mechanism which moves the optical member so that the afocal beams guided to the condensing optical element move parallel along a vertical direction to an optical axis of the condensing optical element.

10. The three-dimensional measuring apparatus according to claim 1, wherein the optical path switching section includes a mirror.

11. The three-dimensional measuring apparatus according to claim 1, wherein the first projecting optical system comprises:
   an afocal optical system which makes the beams transmitted through the lattice pattern afocal; and
   a reflection member which causes the afocal beams to enter one of the observing optical paths in the microscopes.

12. The thee-dimensional measuring apparatus according to claim 1, wherein the second projecting optical system comprises:
   an afocal optical system which makes the beams transmitted though the lattice pattern afocal;
   at least one optical members which vary a direction in which the afocal beams travel; and
   a condensing optical element which forms the afocal beams transmitted through the optical member into the lattice pattern image on a surface of the sample.

13. The thee-dimensional measuring apparatus according to claim 1, wherein the second projecting optical system comprises:
   an afocal optical system which makes the beams transmitted though the lattice pattern afocal;

at least one optical member which varies the direction in which the afocal beams travel;

a condensing optical element which forms the afocal beams transmitted through the optical member into the lattice pattern image on the surface of the sample, and a projection angle switching section which varies the predetermined angle at which the lattice pattern image is projected on the surface of the sample.

14. A method for three-dimensional measurement comprising:

setting parameters including a magnification of an observing system and a maximum measurement range of a sample;

determining a lattice pitch of a lattice pattern on the basis of the set parameters;

using a lattice pattern generated with the lattice pitch to pick up a lattice pattern image from the sample and acquiring a picked-up image of each position while shifting the lattice pattern generated with the lattice pitch, over several levels; and determining a phase from the acquired picked-up image of each position, determining a height using a difference between the phase and a basic phase corresponding to the magnification and maximum measurement range included in pre-provided parameters, and displaying the height in a display section.

15. The method for three-dimensional measurement according to claim 14, further comprising setting a degree of measurement accuracy and measurement speed as the parameters.

16. The method for three-dimensional measurement according to claim 15, wherein the height is determined using a difference between the reference phase and measurement parameters including the parameters for the magnification and maximum measurement range plus a degree of measurement accuracy and measurement speed.

* * * * *